(12) United States Patent
Mizusaki et al.

(10) Patent No.: US 10,774,182 B2
(45) Date of Patent: Sep. 15, 2020

(54) LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Hiroshi Tsuchiya, Sakai (JP); Takashi Satoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 112 days.

(21) Appl. No.: 16/308,767

(22) PCT Filed: Jun. 8, 2017

(86) PCT No.: PCT/JP2017/021226
§ 371 (c)(1),
(2) Date: Dec. 10, 2018

(87) PCT Pub. No.: WO2017/217304
PCT Pub. Date: Dec. 21, 2017

(65) Prior Publication Data
US 2019/0144607 A1 May 16, 2019

(30) Foreign Application Priority Data
Jun. 15, 2016 (JP) .................. 2016-119227

(51) Int. Cl.
*C08G 73/10* (2006.01)
*G02F 1/1337* (2006.01)
(Continued)

(52) U.S. Cl.
CPC ......... *C08G 73/1057* (2013.01); *C08G 73/10* (2013.01); *G02F 1/0316* (2013.01);
(Continued)

(58) Field of Classification Search
CPC ... C08G 73/1057; C08G 73/10; G02F 1/1337; G02F 1/0316; G02F 1/133308;
(Continued)

(56) References Cited

U.S. PATENT DOCUMENTS

2013/0101755 A1* 4/2013 Lee .................. G02F 1/133707
428/1.23
2014/0249244 A1* 9/2014 Chappellet ........ G02F 1/133719
522/176

FOREIGN PATENT DOCUMENTS

JP 2004-053914 A 2/2004

\* cited by examiner

*Primary Examiner* — Eli D. Strah
(74) *Attorney, Agent, or Firm* — ScienBiziP, P.C.

(57) ABSTRACT

The present invention provides a liquid crystal display device in which flicker and image sticking caused by long-term use are suppressed. The liquid crystal display device includes, in the following order: a first substrate; a liquid crystal layer; and a second substrate, the liquid crystal display device including an alignment film including a polymer containing a salicylic acid derivative functional group in a side chain on the liquid crystal layer side of at least one of the first substrate and the second substrate, the salicylic acid derivative functional group having a structure represented by the following formula (Z):

[Formula 1]

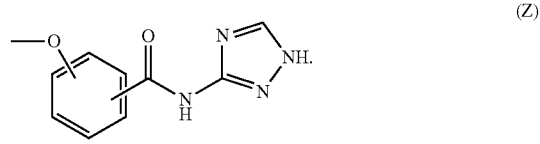

12 Claims, 2 Drawing Sheets

(51) Int. Cl.
 *G02F 1/03* (2006.01)
 *G02F 1/1333* (2006.01)

(52) U.S. Cl.
 CPC ...... *G02F 1/1337* (2013.01); *G02F 1/133308* (2013.01); *G02F 1/133711* (2013.01); *B32B 2457/202* (2013.01); *Y10T 428/1005* (2015.01); *Y10T 428/1023* (2015.01)

(58) Field of Classification Search
 CPC ............ G02F 1/133711; G02F 1/1362; G02F 1/133555; G02F 1/133553; G02F 2001/13712; Y10T 428/1005; Y10T 428/1023; B32B 2457/202
 See application file for complete search history.

(a)

(b)

LIQUID CRYSTAL DISPLAY DEVICE

TECHNICAL FIELD

The present invention relates to a liquid crystal display device. More specifically, the present invention particularly relates to a liquid crystal display device suitably used when a reflective electrode for reflecting ambient light is provided.

BACKGROUND ART

Liquid crystal display devices utilize a liquid crystal composition for display. The typical display mode thereof is irradiating a liquid crystal display panel containing a liquid crystal composition sealed between paired substrates with backlight illumination and applying voltage to the liquid crystal composition to change the alignment of the liquid crystal molecules, thereby controlling the amount of light passing through the liquid crystal display panel. Such liquid crystal display devices have features including a thin profile, light weight, and low power consumption, and have therefore been used for electronic devices such as televisions, smartphones, tablet terminals, and car navigation systems.

In a liquid crystal display device, the alignment of liquid crystal molecules with no voltage applied is typically controlled by alignment films having been subjected to an alignment treatment. The alignment treatment has conventionally been performed by the rubbing method of rubbing the surface of an alignment film with a roller or the like. However, since the number of the conductive lines and the area of the black matrix provided in the liquid crystal panel have been increased, irregularities are now more likely to occur on the substrate surfaces in the liquid crystal panel. With irregularities on the substrate surfaces, the portions near the irregularities may not be properly rubbed by the rubbing method.

In order to deal with this problem, studies and development have been made on a photo-alignment method which is an alternative alignment treatment method to the rubbing method and irradiates the surface of an alignment film with light. With the photo-alignment method, an alignment treatment can be performed without contact with the surface of the alignment film. The photo-alignment method therefore has an advantage that alignment treatment is less likely to be uneven even with irregularities on a substrate surface, so that a favorable liquid crystal alignment can be achieved on the entire substrate.

As a liquid crystal display device having an alignment film, for example, Patent Literature 1 discloses a liquid crystal panel having a liquid crystal layer, an electrode, an inorganic material film, and an alignment film containing a light stabilizer mainly composed of a hindered amine compound.

CITATION LIST

Patent Literature
Patent Literature 1: JP 2004-53914 A

SUMMARY OF INVENTION

Technical Problem

In the field of liquid crystal display devices, techniques for suppressing electrode consumption have been studied, and reflective liquid crystal display devices which display images using reflection of ambient light without requiring backlight illumination have been proposed. In the reflective liquid crystal display device, a conductive material with a high degree of ionization such as Al, Ag, Zn, or Cu is used as a reflective electrode, so that the long-term use leads to a reduction in VHR (Voltage Holding Ratio] and an increase in residual DC voltage, causing flicker and image sticking, which may lower reliability.

However, Patent Literature 1 does not disclose a technique for suppressing flicker and image sticking caused by long-term use.

The present invention has been made in view of such a current state of the art and aims to provide a liquid crystal display device in which flicker and image sticking caused by long-term use are suppressed.

Solution to Problem

The present inventors conducted various studies on a liquid crystal display device in which flicker and image sticking caused by long-term use are suppressed. The present inventors have found that even in the case of using an electrode containing metal such as Al, by using a polymer having a salicylic acid derivative functional group in the side chain for an alignment film, a complex is formed between a metal ion such as $Al^{3+}$ and the salicylic acid derivative functional group, and it is possible to suppress oxidation-reduction reaction caused by metal ions. Thereby, the reduction in VHR and the increase in residual DC voltage are suppressed, and the inventors have arrived at the solution to the above problem, completing the present invention.

That is, one aspect of the present invention may be a liquid crystal display device including, in the following order: a first substrate; a liquid crystal layer; and a second substrate, the liquid crystal display device including an alignment film including a polymer having a salicylic acid derivative functional group in the side chain on the liquid crystal layer side of at least one of the first substrate and the second substrate. In this liquid crystal display device, the salicylic acid derivative functional group has a structure represented by the following formula (Z).

[Formula 1]

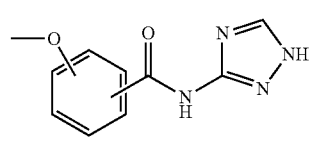

(Z)

The structure represented by the above formula (Z) may be a part of a structure represented by the following formula (ZA):

[Formula 2]

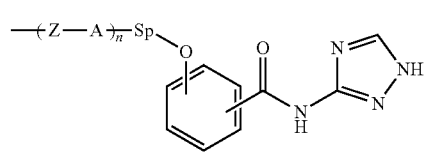

(ZA)

wherein Sp represents an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; and n represents an integer of 0 or more.

The polymer may have a carboxyl group.

The polymer may be a polyamic acid, a polyimide, a polysiloxane, polyacryl, polymethacryl, or polyvinyl.

The polymer may include a photoreactive functional group.

The photoreactive functional group may be a cinnamate group, a chalcone group, a coumarin group, an azobenzene group, or a tolan group.

The polymer may be a polyamic acid with a structure represented by the following formula (P1-A):

[Formula 3]

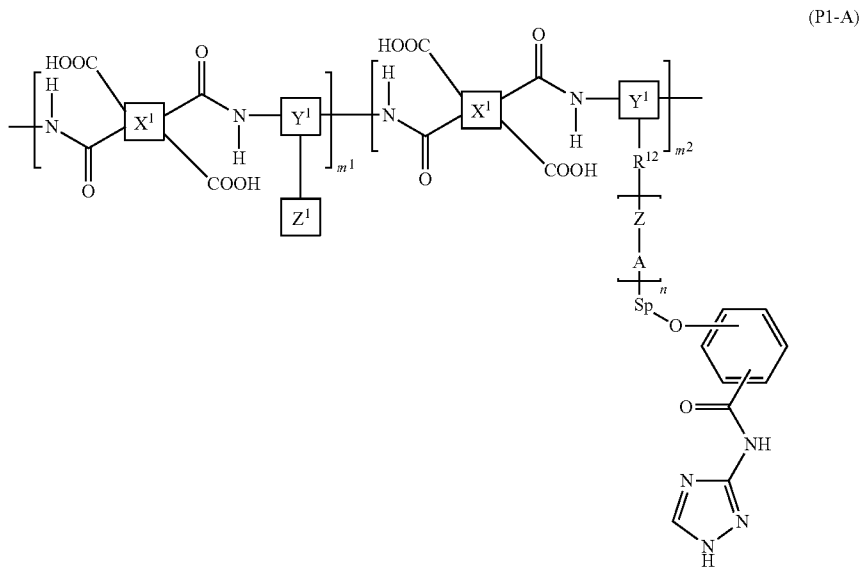

(P1-A)

wherein X$^1$s are each a group represented by the following formula (PA-1), Y$^1$s are the same as or different from each other and each a group represented by the following formula (PA-2) or (PA-3), and Z$^1$s area the same as or different from each other and each a vertically alignable group, a horizontally alignable group, a photoreactive functional group, or a combination thereof;

Sps are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond;

ns are the same as or different from each other and each represent an integer of 0 or more;

R$^{12}$s are the same as or different from each other and each represent a hydrocarbon group having 1 to 10 carbon atoms or a direct bond; and m$^1$ and m$^2$ each independently represent a natural number.

[Formula 4]

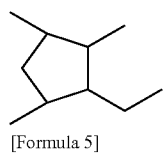
(PA-1)

[Formula 5]

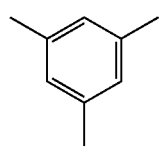
(PA-2)

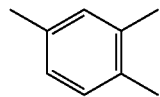
(PA-3)

The liquid crystal layer may be formed of a liquid crystal material having negative anisotropy of dielectric constant.

The liquid crystal material may have an anisotropy of dielectric constant of −5.0 or less.

At least one of the first substrate and the second substrate has an electrode, and the electrode may include at least one selected from the group consisting of Al, Ag, Zn, Cu and alloys thereof.

The liquid crystal display device may be a reflective liquid crystal display device.

The liquid crystal display device may be a transflective liquid crystal display device.

Advantageous Effects of Invention

The present invention can provide a liquid crystal display device in which flicker and image sticking caused by long-term use are suppressed.

DESCRIPTION OF EMBODIMENTS

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

Embodiment 1

Figure 1:
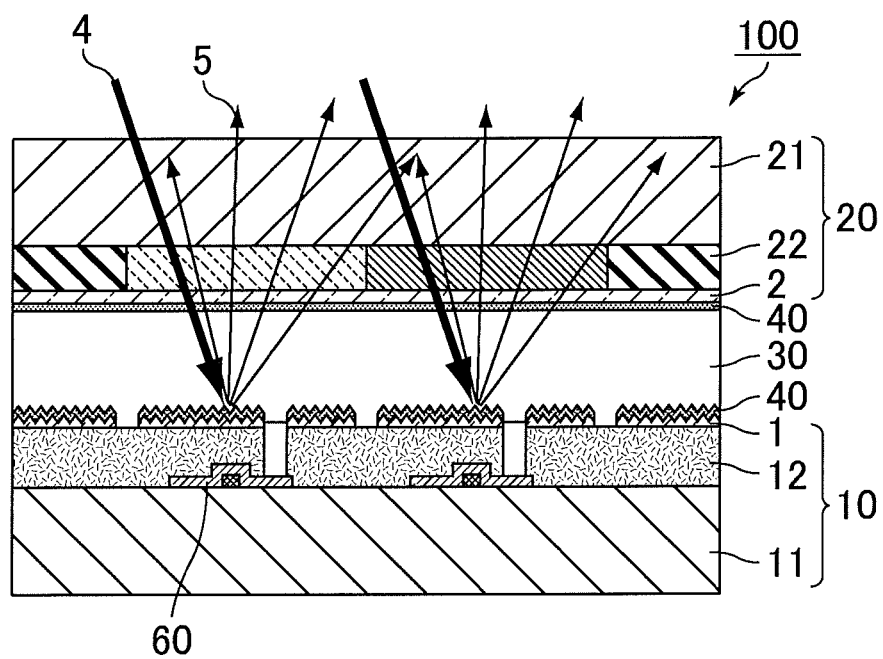
FIG. 1 is a view relating to a reflective liquid crystal display device of Embodiment 1, in which (a) is a schematic cross-sectional view of the reflective liquid crystal display device, and (b) is a schematic cross-sectional view enlarging (a).
Figure 1:
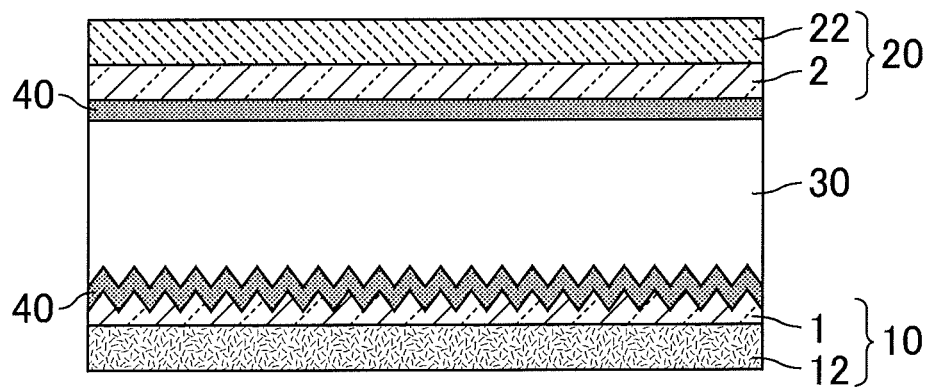

FIG. 1 is a view relating to a reflective liquid crystal display device of Embodiment 1, in which (a) is a schematic cross-sectional view of the reflective liquid crystal display device, and (b) is a schematic cross-sectional view enlarging (a). As shown in FIG. 1, a reflective liquid crystal display device 100 of the present embodiment sequentially has a first substrate 10, a liquid crystal layer 30, and a second substrate 20, and has an alignment film 40 on the liquid crystal layer 30 side of the first substrate 10 and the second substrate 20. The alignment film 40 contains a polymer having a salicylic acid derivative functional group in the side chain, and the salicylic acid derivative functional group has a structure represented by the following formula (Z). The "polymer having a salicylic acid derivative functional group in the side chain" herein is also referred to as a "polymer".

[Formula 6]

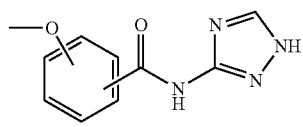
(Z)

The first substrate 10 in the reflective liquid crystal display device 100 has a thin-film transistor (TFT: Thin Film Transistor) 60 and further has a transparent substrate 11, an insulating film 12, and a reflective electrode 1 in order toward the liquid crystal layer 30. The second substrate 20 has a transparent substrate 21, a color filter 22, and a transparent electrode 2 in order toward the liquid crystal layer 30.

In the reflective liquid crystal display device 100 of the present embodiment, since the alignment film 40 contains a polymer having a salicylic acid derivative functional group in the side chain, for example even when metal ions are generated from the reflective electrode 1, a complex is formed between the metal ion and the salicylic acid derivative functional group, and it is possible to suppress oxidation-reduction reaction caused by the metal ions. As a result, even with long-term use, it is possible to suppress a reduction in VHR and an increase in residual DC voltage in the reflective liquid crystal display device 100, and flicker and image sticking can be suppressed. Details will be described below.

As in a reflective liquid crystal display device and a transflective liquid crystal display device, when a metal plate electrode material with high degree of ionization such as Al, Ag, Zn, or Cu is used as an electrode of a liquid crystal display device, moisture comes into contact with the metal plate electrode material, whereby metal ions such as $Al^{3+}$ are easily generated. Since the electrode used in the liquid crystal display device has a portion in direct contact with an interlayer film or an alignment film formed of an organic material, for example when using an alignment film containing polyamic acid having a carboxyl group, oxidation-reduction reaction as shown in the following formula 1 occurs by heat or light between a metal ion such as $Al^{3+}$ and the carboxyl group in the polyamic acid, and a radical is generated from the carboxyl group.

[Formula 7]

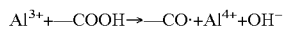

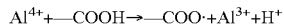 (Formula 1)

Here, the moisture ionizing a metal electrode material is taken into the liquid crystal layer through a seal bulk (sealing material) or through an interface between a seal material and the alignment film, and this moisture is also penetrated to an electrode portion in a liquid crystal panel to ionize a metal plate electrode material, so that metal ions are generated. This metal ion passes through the alignment film and transfers to the liquid crystal layer. Liquid crystal molecules having negative anisotropy of dielectric constant (also referred to as negative type liquid crystal molecules) contain many high-polarity atoms, such as oxygen atoms, fluorine atoms and chlorine atoms, as compared with liquid crystal molecules having positive anisotropy of dielectric constant (also referred to as positive type liquid crystal molecules), and an alkoxyl group and fluorine atoms may be contained in the molecule, so that the polarity of the negative type liquid crystal molecules is higher than the polarity of the positive type liquid crystal molecules. Accordingly, as compared with a liquid crystal material containing positive type liquid crystal molecules, a liquid crystal material containing negative type liquid crystal molecules tends to easily take in polar moisture and to easily cause ionization of a metal plate electrode material.

The radical generated by the oxidation-reduction reaction as shown in the above formula 1 transfers to a liquid crystal layer (a liquid crystal layer mainly using a negative liquid crystal material) and is ionized by electron transfer.

In polymers such as polyamic acid (polyimide) used as materials of the alignment film, an ester group is generally used as a functional group connecting a main chain and a side chain. The ester group undergoes hydrolysis under the influence of moisture as shown in the following formula 2 to form a carboxyl group.

[Formula 8]

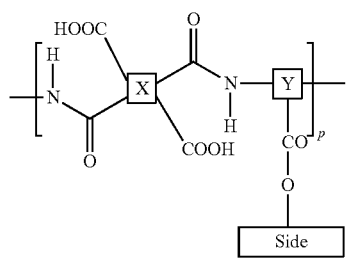

(Formula 2)

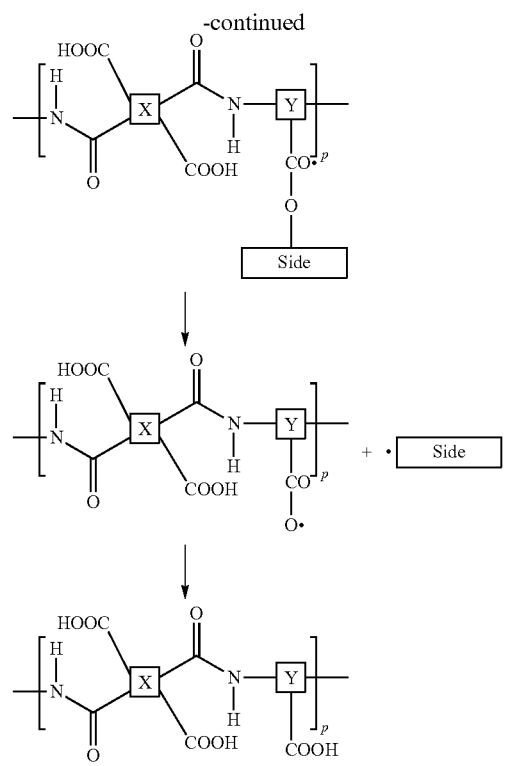

In the formula 2, X represents a tetravalent organic group, Y represents a trivalent organic group, Side represents a structure of a part of a polymer side chain, and p represents an integer of 1 or more.

The carboxyl group formed by the hydrolysis also undergoes the oxidation-reduction reaction shown in the above formula 1 to form a radical, and this radical transfers to the liquid crystal layer, and finally ions are formed.

Thus, if ion density in the liquid crystal layer increases due to, for example, the carboxyl group in the polyamic acid and the carboxyl group formed by hydrolysis, this causes the reduction in VHR and the increase in residual DC voltage in the liquid crystal display device in the long-term use, so that flicker and image sticking occur.

Thus, in the reflective liquid crystal display device 100 of the present embodiment, in order to suppress the oxidation-reduction reaction caused by metal ions, the polymer having a salicylic acid derivative functional group in the side chain having the structure represented by the above formula (Z) is contained in the alignment film 40. Consequently, a complex due to a coordination bond is easily formed between a metal ion such as $Al^{3+}$ and the salicylic acid derivative functional group having an amine skeleton. As a result, for example, even when a carboxyl group is present in the polymer, the oxidation-reduction reaction between the metal ion and the carboxyl group is suppressed, and therefore, the formation of a radical in the alignment film 40 is suppressed, so that it is possible to suppress generation of ions derived from the radical in the liquid crystal panel. Accordingly, in the reflective liquid crystal display device 100 of the present embodiment, it is possible to suppress the reduction in VHR and the increase in residual DC voltage even with the long-term use, and flicker and image sticking can be suppressed.

<Substrate>

As the first substrate 10, an array substrate is preferable. The first substrate 10 of the present embodiment has the insulating film 12 and the reflective electrode 1 on the upper layer of the transparent substrate 11 on the liquid crystal layer 30 side. Examples of the transparent substrate 11 include a glass substrate and a plastic substrate.

As the second substrate 20, a color filter substrate is preferable. The second substrate 20 of the present embodiment has the color filter 22 and the transparent electrode 2 on the upper layer of the transparent substrate 21 on the liquid crystal layer 30 side. Examples of the transparent substrate 21 include a glass substrate and a plastic substrate. The color combination of the color filter 22 is not particularly limited and may be a combination of red, green, and blue or a combination of red, green, blue, and yellow.

The first substrate 10 and the second substrate 20 are bonded to each other with a sealing agent so as to sandwich the liquid crystal layer 30 therebetween. The material of the sealing agent can be a heat-curable material, an ultraviolet-curable material, or both of these materials.

(Electrode)

The reflective liquid crystal display device 100 of the present embodiment has a pixel electrode and a common electrode. In the present embodiment, the reflective electrode 1 provided on the first substrate 10 is a pixel electrode, and the transparent electrode 2 provided on the second substrate 20 is a common electrode.

In the reflective liquid crystal display device 100 of the present embodiment, light taken from outside using the reflective electrode 1 is reflected in the liquid crystal display device, and whereby it is possible to display an image without using backlight illumination and to reduce power consumption.

The reflective electrode 1 is an electrode reflecting ambient light 4 to generate reflected light 5, and is formed of a material with high reflectance. In order to reflect the ambient light 4 more efficiently, the reflective electrode 1 has a concavo-convex shape on its surface. As described above, the reflective liquid crystal display device 100 of the present embodiment uses as a pixel electrode the reflective electrode 1 having the concavo-convex shape, and has an MRS structure (Micro Reflective Structure: micro reflective electrode structure) in which an electrode itself driven by the TFT 60 also has a reflection function. Although the reflective liquid crystal display device 100 of the present embodiment includes the TFT 60, the reflective liquid crystal display device may be a passive driving type liquid crystal display device without TFT.

The reflective electrode 1 preferably contains at least one selected from the group consisting of Al, Ag, Cu, Zn and alloys thereof.

As the material of the transparent electrode 2, a transparent conductive material such as indium tin oxide (ITO), indium zinc oxide (IZO), zinc oxide (ZnO), or tin oxide (SnO), or an alloy thereof is used.

<Liquid Crystal Layer>

The liquid crystal material used in the liquid crystal layer 30 may have negative or positive value for the anisotropy of dielectric constant (Δε) defined by the formula below.

Δε=(dielectric constant in the major axis direction)−(dielectric constant in the minor axis direction)

The anisotropy of dielectric constant (Δε) of the liquid crystal material can be obtained by preparing a horizontal alignment liquid crystal cell or a vertical alignment liquid crystal cell and calculating a dielectric constant in the major axis direction and a dielectric constant in the minor axis direction using capacitance values before and after applying high voltage.

The anisotropy of dielectric constant (Δε) of the liquid crystal material is preferably −5.0 or less, more preferably −5.5 or less, and further preferably −6.0 or less. When the anisotropy of dielectric constant of the liquid crystal material having negative anisotropy of dielectric constant is set within the above range, the liquid crystal material can be used more suitably in a liquid crystal display device requiring low voltage drive.

<Alignment Film>

The alignment film 40 has a function of controlling alignment of a liquid crystal compound in the liquid crystal layer 30. When voltage applied to the liquid crystal layer 30 is less than a threshold voltage (including no voltage application), the alignment of the liquid crystal compound in the liquid crystal layer 30 is controlled mainly by the action of the alignment film 40. In this state (hereinafter also referred to as an initial alignment state), the angle formed by the major axis of the liquid crystal compound with respect to the surfaces of the first substrate 10 and the second substrate 20 is called a "pre-tilt angle". The "pre-tilt angle" herein means an angle of the inclination of the liquid crystal compound from the direction parallel to the substrate surfaces. The angle parallel to the substrate surfaces is 0°, and the angle corresponding to the normal of the substrate surfaces is 90°.

The alignment film 40 of the present embodiment contains a polymer having a salicylic acid derivative functional group in the side chain, and the salicylic acid derivative functional group has a structure represented by the following formula (Z). In the following formula (Z), the ether group and the amide group may be bonded to any of carbon atoms constituting the benzene ring, and it is preferable that the ether group and the amide group be bonded at the ortho position.

[Formula 9]

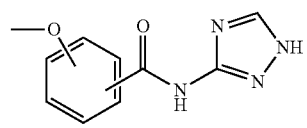

(Z)

In the reflective liquid crystal display device 100 of the present embodiment, since the alignment film 40 contains a polymer having a salicylic acid derivative functional group in the side chain, a complex is formed between metal ions such as $Al^{3+}$ generated from the reflective electrode 1 and the salicylic acid derivative functional group, and it is possible to suppress oxidation-reduction reaction caused by the metal ions. As a result, even with long-term use, it is possible to suppress the reduction in VHR and the increase in residual DC voltage, and flicker and image sticking can be suppressed.

The polymer of the present embodiment is obtained by introducing a salicylic acid derivative functional group into a polymer side chain by chemical bonding. A polymer having both the function of aligning liquid crystal molecules and the function of suppressing the oxidation-reduction reaction caused by metal ions can be synthesized by copolymerizing a monomer having a vertically aligned group vertically aligning liquid crystal molecules, a horizontal alignment group horizontally aligning liquid crystal molecules, a photo-alignment group expressing anisotropy by light irradiation, or the like, and a monomer having the structure represented by the above formula (Z).

In Patent Literature 1, although an additive having a benzotriazole group is added as an ultraviolet absorber into an alignment film, the benzotriazole group has a saturated amine structure and is less likely to form a complex with a metal ion (or does not form a complex).

The molecular weight of the additive in Patent Literature 1 is about 250 to 3000. On the other hand, in the present embodiment, a polymer having a salicylic acid derivative in the side chain is used. Since the molecular weight of the polymer is generally about 10000 or more, in the reflective liquid crystal display device 100 of the present embodiment, exudation of the polymer into the liquid crystal layer 30 can be suppressed.

The structure represented by the above formula (Z) is preferably a part of a structure represented by the following formula (ZA):

[Formula 10]

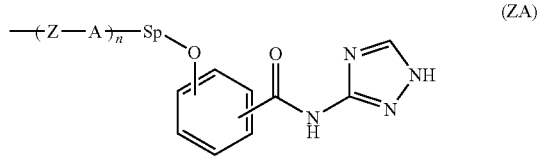

(ZA)

wherein Sp represents an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; and n represents an integer of 0 or more.

In the above formula (ZA), at least one hydrogen atom contained in each structure may be substituted with a halogen group, a methyl group, or an ethyl group.

In the above formula (ZA), Sp is preferably a —CO— group or a direct bond.

A is preferably a 1,4-phenylene group, a 1,4-cyclohexenylene group, a naphthalene-2,6-diyl group or a 1,4-cyclohexylene group, more preferably a 1,4-phenylene group or a 1,4-cyclohexylene group, and further preferably a 1,4-phenylene group.

Z is preferably an —O— group, an —NH— group, a —CO— group, a —COO— group, an —OCO— group or a direct bond, more preferably an —O— group, a —COO— group, an —OCO— group or a direct bond, further preferably a —COO— group, an —OCO— group or a direct bond.

The symbol n is preferably 0 to 8, more preferably 0 to 5, further preferably 1 to 5. Since the mobility of the salicylic acid derivative functional group at the end of the side chain is improved by increasing n, complex formation efficiency is improved. When n is too large, the mobility of the side chain molecule becomes too high, and as a result, image sticking due to application of AC voltage may occur. It is therefore preferable that n is within the above range.

In the above formula (ZA), preferably, Sp is a —CO— group or a direct bond, As are the same as or different from each other and each a 1,4-phenylene group or a 1,4-cyclohexylene group, Zs are the same as or different from each other and each a —COO— group, an —OCO— group or a direct bond, and n is an integer of 1 to 5. In the above formula (ZA), more preferably, Sp is a —CO— group, A is a 1,4-phenylene group, Z is the same or different and is a —COO— group or an —OCO— group, and n is an integer of 1 to 5.

Each molecule of the polymer having a salicylic acid derivative functional group in the side chain may contain one type or two or more types of salicylic acid derivative functional groups.

The alignment film 40 includes one in which the liquid crystal compound in the liquid crystal layer 30 is aligned substantially vertically (vertical alignment film) and one in which the liquid crystal compound is aligned substantially horizontally (horizontal alignment film). In the case of a vertical alignment film, a pre-tilt angle in substantially vertical alignment is preferably 85° or more and 90° or less. In the case of a horizontal alignment film, the pre-tilt angle in substantially horizontal alignment is preferably 0° or more and 5° or less.

The alignment treatment method for the alignment film 40 is not particularly limited, and examples thereof include rubbing treatment and photo-alignment treatment.

In the rubbing treatment, a roller wrapped with cloth such as nylon is rotated with respect to the first substrate 10 and the second substrate 20 applied with the alignment film 40 while pushing with a constant pressure, and whereby the surface of the alignment film 40 is rubbed in a certain direction.

In the photo-alignment treatment, linearly polarized ultraviolet rays are irradiated onto a photo-alignment film formed from a material exhibiting photoalignability to selectively change the structure of the photo-alignment film in a polarization direction, and whereby anisotropy is generated in the photo-alignment film to impart an alignment azimuth angle to the liquid crystal molecules. The material exhibiting photoalignability means any general material that, when irradiated with light (electromagnetic waves) such as ultraviolet light or visible light, undergoes a structural change to exhibit performance (alignment force) of controlling the alignment of the nearby liquid crystal molecules, or to change in the alignment force power and/or direction. Examples of the material exhibiting photoalignability include those including a photo-reactive site that undergoes a reaction such as dimerization (dimer formation), isomerization, photo-Fries rearrangement, or decomposition, when irradiated with light.

Examples of the photo-reactive site (functional group) that undergoes dimerization and isomerization when irradiated with light include cinnamate, chalcone, coumarin, and stilbene. Examples of the photo-reactive site that undergoes isomerization when irradiated with light include azobenzene and tolan. Examples of the photo-reactive site that undergoes photo-Fries rearrangement when irradiated with light include a phenolic ester structure. Examples of the photo-reactive site that undergoes decomposition when irradiated with light include a cyclobutane structure.

It is preferable that the alignment film 40 is a photo-alignment film capable of performing photo-alignment treatment, it is more preferable that the polymer having a salicylic acid derivative functional group in the side chain contained in the alignment film 40 contains a photoreactive functional group, and it is further preferable that the photoreactive functional group is a cinnamate group, a chalcone group, a coumarin group, an azobenzene group, or a tolan group. Such an aspect can avoid occurrence of streaky display unevenness and static electricity generated when an alignment film for rubbing treatment is used.

The weight average molecular weight of the polymer having a salicylic acid derivative functional group in the side chain in the present embodiment is preferably 10000 to 1000000, more preferably 30000 to 200000. When the weight average molecular weight of the polymer is set within the above range, it is easy to form a uniform film with a desired thickness. When the weight average molecular weight of the polymer is too small, it is difficult to form a film with a desired thickness, and when the film thickness is too large, a uniform film thickness cannot be obtained, so that irregularities on the film surface may become conspicuous.

The polymer having a salicylic acid derivative functional group in the side chain in the present embodiment is preferably polyamic acid, polyimide, polysiloxane, polyacryl, polymethacryl, or polyvinyl. The above-mentioned polymer may be a homopolymer or a copolymer.

The polyamic acid preferably has a structure represented by the following formula (P1), and the polyimide preferably has a structure represented by the following formula (P2):

[Formula 11]

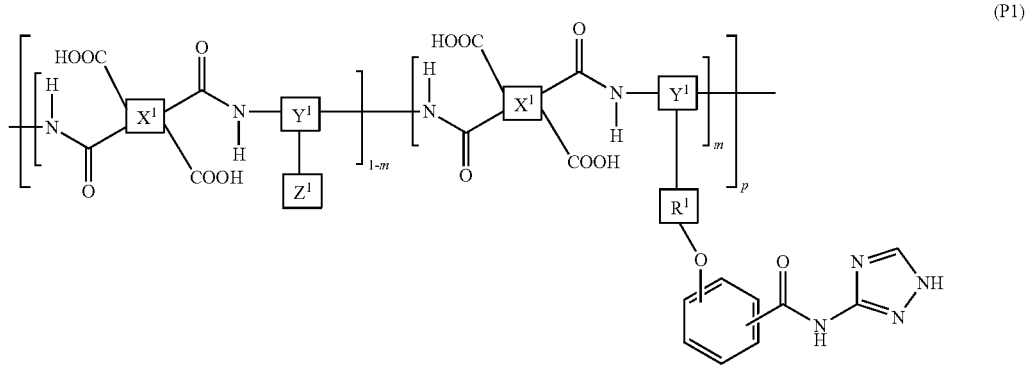

(P1)

[Formula 12]

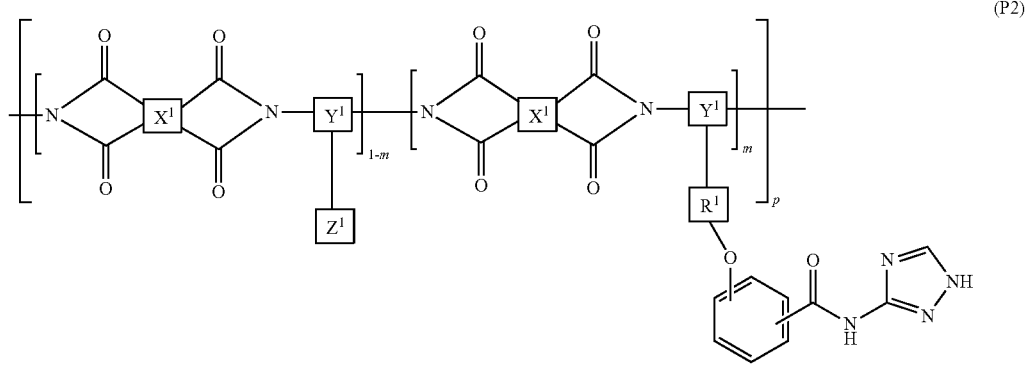

(P2)

wherein $X^1$s are the same as or different from each other and each represent a tetravalent aromatic group or aliphatic group, $Y^1$s are the same as or different from each other and each represent a trivalent aromatic group or aliphatic group, $Z^1$s are the same as or different from each other and each represent a monovalent organic group or a hydrogen atom, $R^1$s are the same as or different from each other and each represent a divalent organic group, p is an integer of 1 or more, and m satisfies $0<m<1$.

In the above formulas (P1) and (P2), preferably, $X^1$s are the same as or different from each other, each represent a tetravalent aromatic group or aliphatic group, and are each an aromatic group having 6 to 20 carbon atoms or an aliphatic group having 4 to 20 carbon atoms having an alicyclic group, more preferably an aliphatic group having 4 to 20 carbon atoms having 1 to 3 alicyclic groups having 4 to 6 carbon atoms. When two or more cyclic structures are contained, the cyclic structures may be bonded directly or via a linking group or may be condensed. Examples of the linking group include a hydrocarbon group having 1 to 5 carbon atoms, an —O— group, an —N=N— group, a —C≡C— group, a —CH=CH— group, and a —CO—CH=CH— group. The aliphatic group herein includes both cyclic and acyclic aliphatic groups.

Specific examples of $X^1$ include chemical structures represented by the following formulas (X-1) to (X-16). At least one hydrogen atom contained in each structure may be substituted with a halogen group, a methyl group, or an ethyl group.

[Formula 13]

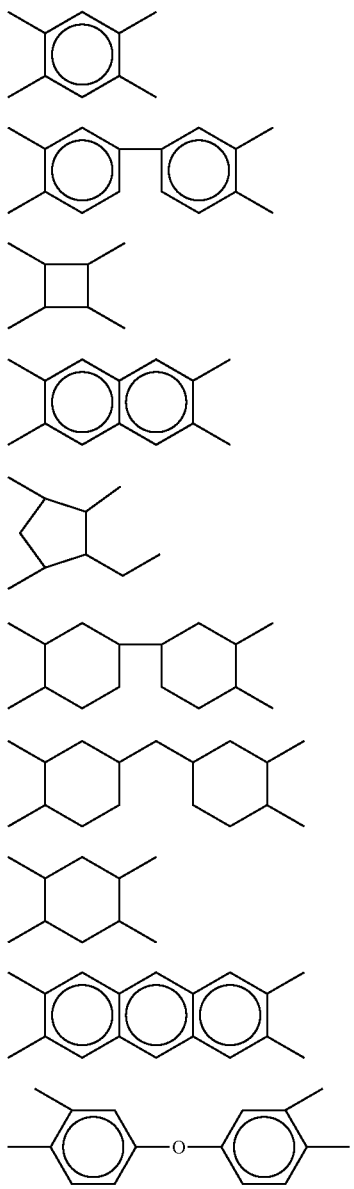

(X-1)
(X-2)
(X-3)
(X-4)
(X-5)
(X-6)
(X-7)
(X-8)
(X-9)
(X-10)

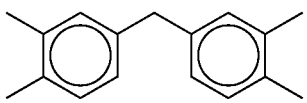

(X-11)

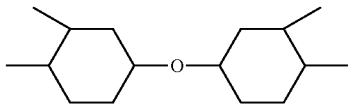

(X-12)

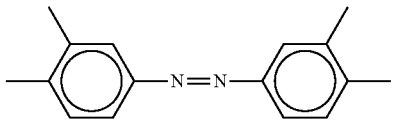

(X-13)

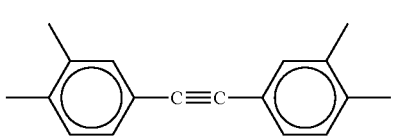

(X-14)

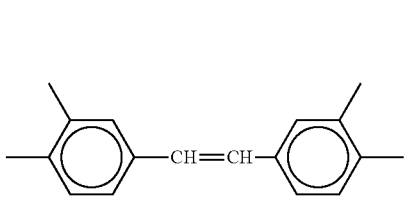

(X-15)

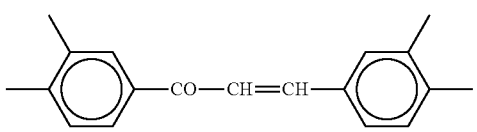

(X-16)

When the rubbing treatment is applied to the alignment film 40, it is preferable that $X^1$ in the above formulas (P1) and (P2) is the same or different and is the structure represented by the above formulas (X-1) to (X-12), and when the photo-alignment treatment is applied to the alignment film 40, it is preferable that $X^1$ is the same or different and is the structure represented by the above formulas (X-13) to (X-16).

In the above formulas (P1) and (P2), preferably, $Y^1$s are the same as or different from each other, each represent a trivalent aromatic group or aliphatic group, and are each an aromatic group having 6 to 20 carbon atoms or an aliphatic group having 4 to 20 carbon atoms having an alicyclic group, more preferably an aromatic group having 6 to 20 carbon atoms containing 1 to 3 aromatic rings having 6 carbon atoms. When two or more cyclic structures are contained, the cyclic structures may be bonded directly or via a linking group or may be condensed. Examples of the linking group include a hydrocarbon group having 1 to 5 carbon atoms, an —O— group, an —N=N— group, a —C≡C— group, a —CH=CH— group, and a —CO—CH=CH— group.

Specific examples of $Y^1$ include chemical structures represented by the following formulas (Y-1) to (Y-24). At least one hydrogen atom contained in each structure may be substituted with halogen, a methyl group, or an ethyl group.

[Formula 14]
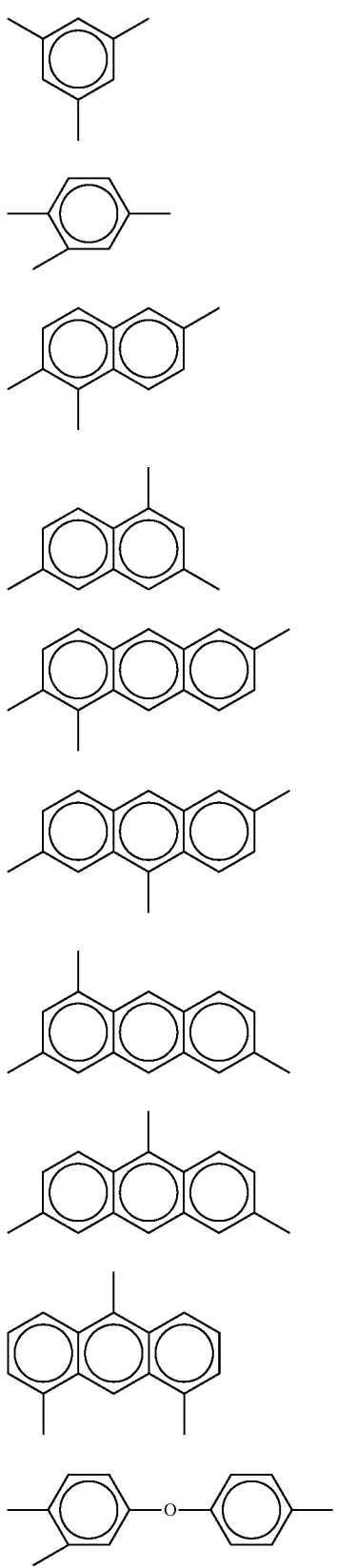
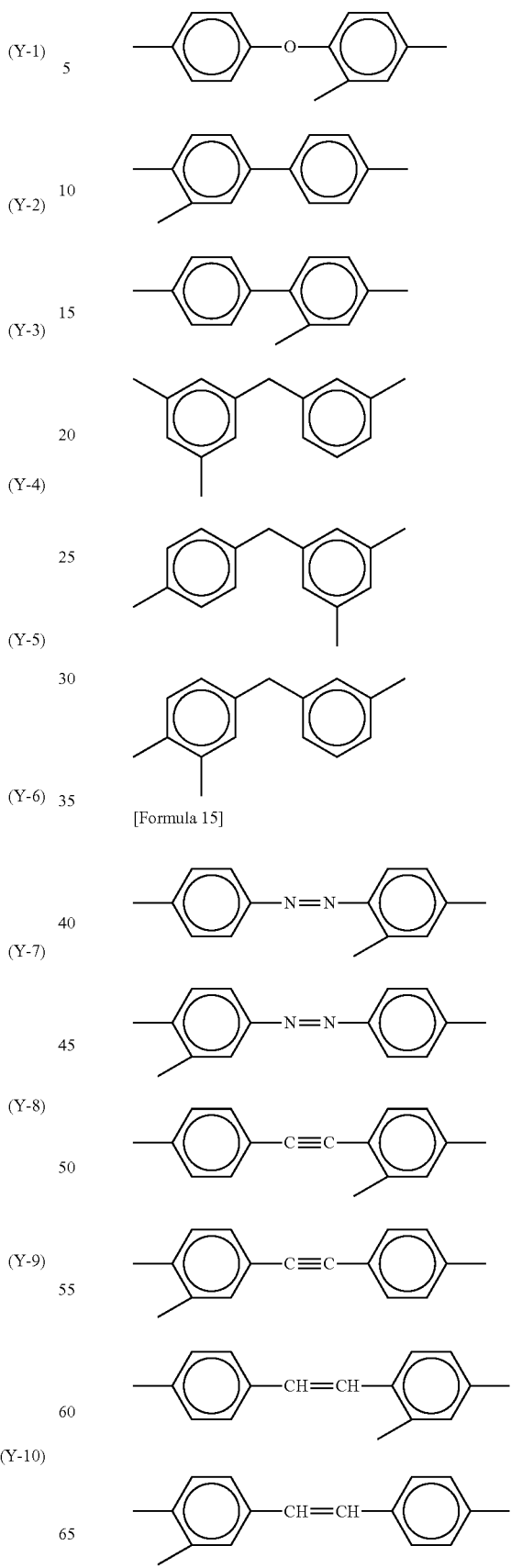
[Formula 15]

When the rubbing treatment is applied to the alignment film 40, it is preferable that $Y^1$s in the above formulas (P1) and (P2) are the same as or different from each other and each the structure represented by the above formulas (Y-1) to (Y-16), and when the photo-alignment treatment is applied to the alignment film 40, it is preferable that $Y^1$s are the same as or different from each other and each the structure represented by the above formulas (Y-17) to (Y-24).

$Z^1$s in the above formulas (P1) and (P2) are the same as or different from each other and each represent a monovalent organic group or a hydrogen atom. The monovalent organic group is preferably a group represented by $—(R^Z)_d—(COO—Z)_e$ or $—(R^Z)_d—(OCO—Z)_e$. In the above formula, $R^Z$ represents an e+1 valent group having 1 to 5 carbon atoms, d represents 0 or 1, e represents 1 or 2, and Z represents a group having 15 to 30 carbon atoms having a cyclic structure. At least one hydrogen atom contained in each structure may be substituted with a halogen group, a methyl group, or an ethyl group.

Specific examples of $Z^1$ include chemical structures represented by the following formulas (Z-1) to (Z-38). At least one hydrogen atom contained in each structure may be substituted with a halogen group, a methyl group, or an ethyl group.

-continued
(Z-15)
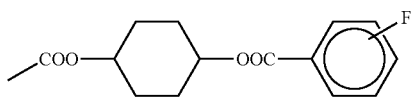
(Z-16)
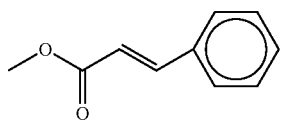
(Z-17)
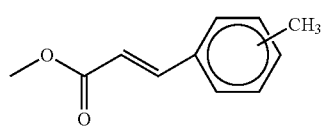
[Formula 18]
(Z-18)
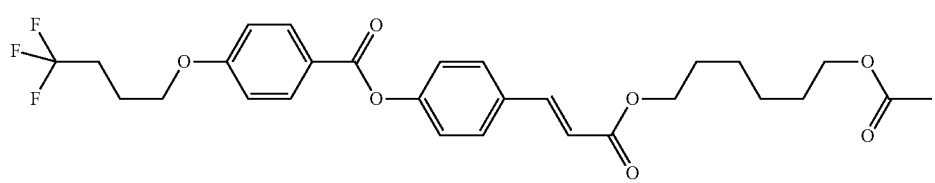
(Z-19)
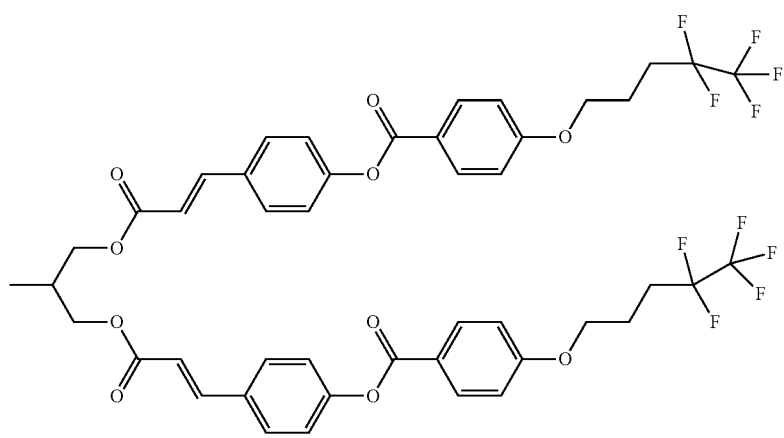
(Z-20)
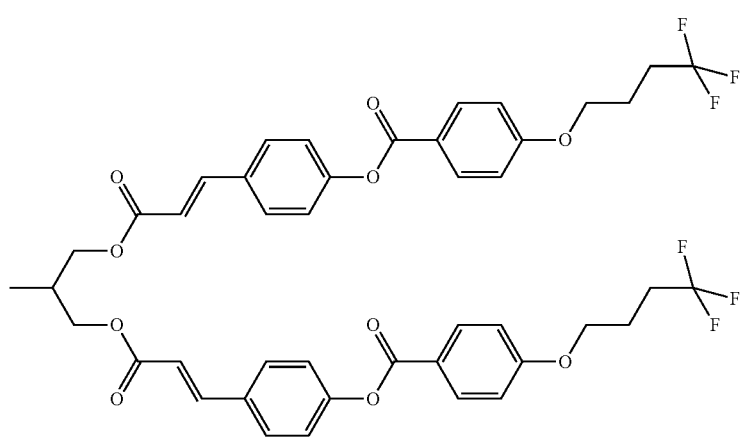
(Z-21)
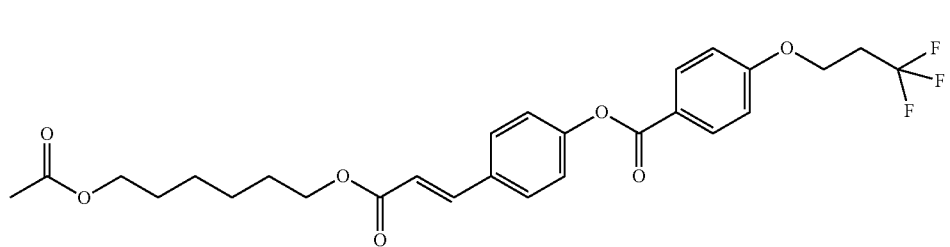

(Z-22)
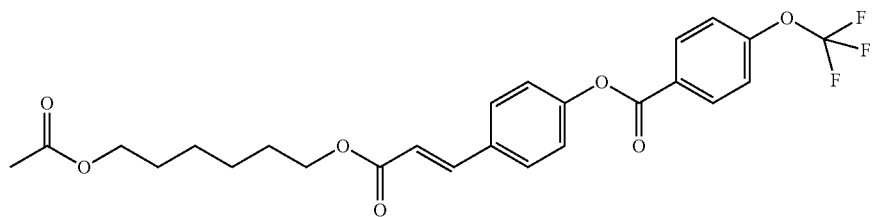
[Formula 19]
(Z-23)
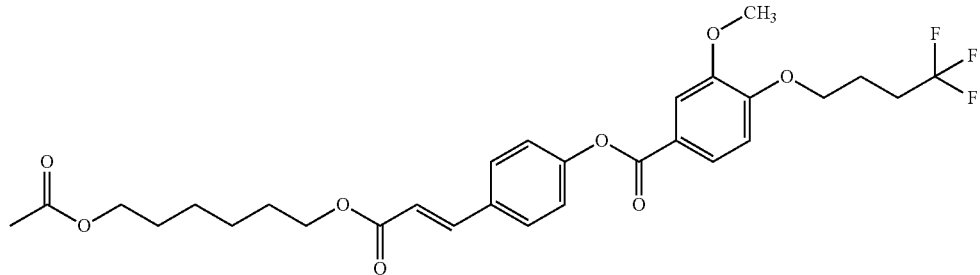
(Z-24)
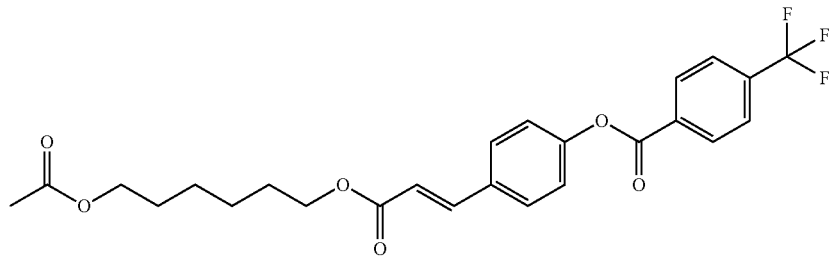
(Z-25)
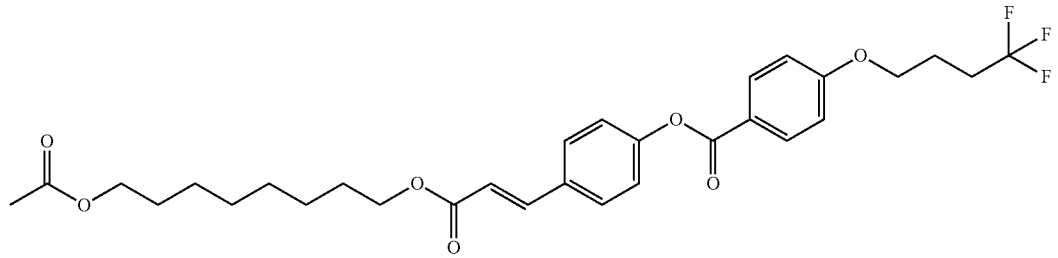
(Z-26)
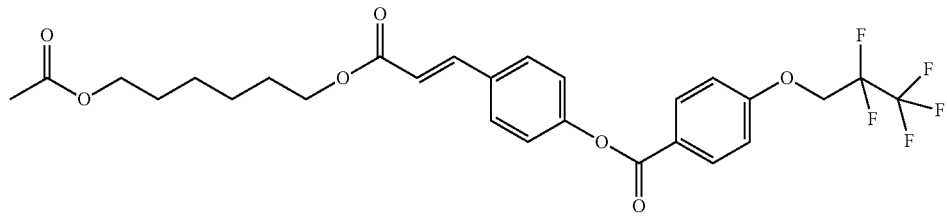
(Z-27)
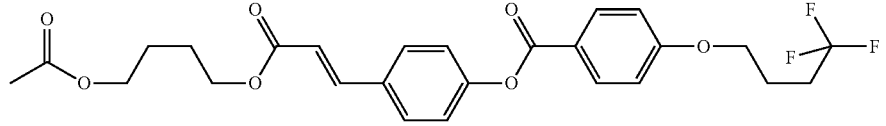

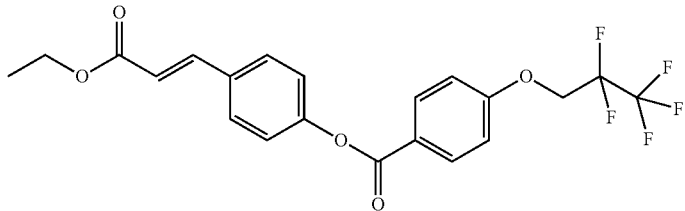
(Z-28)
[Formula 20]
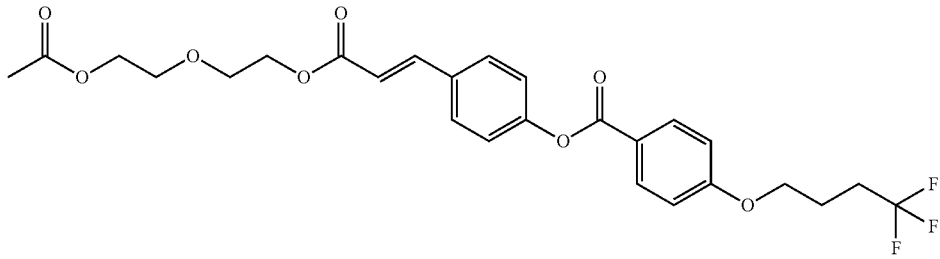
(Z-29)
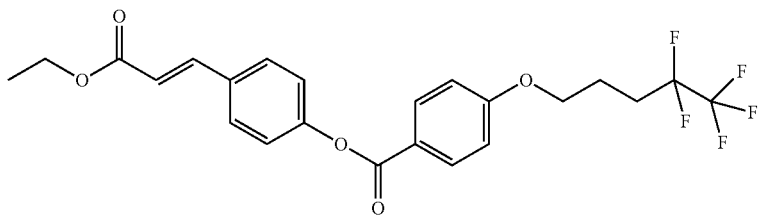
(Z-30)
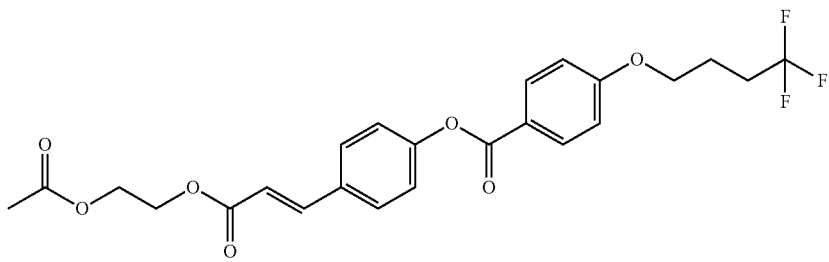
(Z-31)
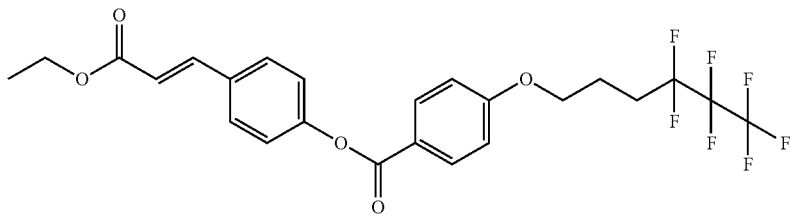
(Z-32)
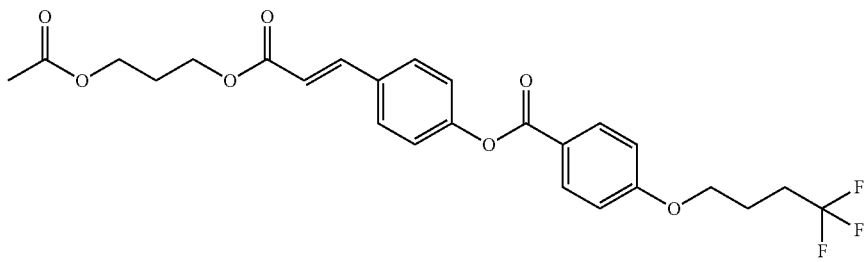
(Z-33)

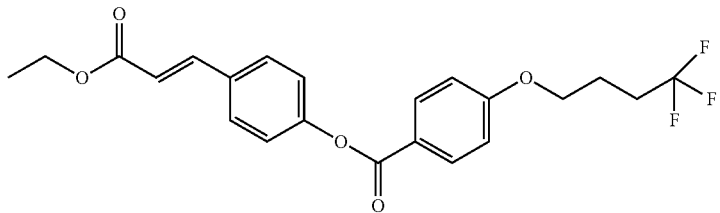

(Z-34)

[Formula 21]

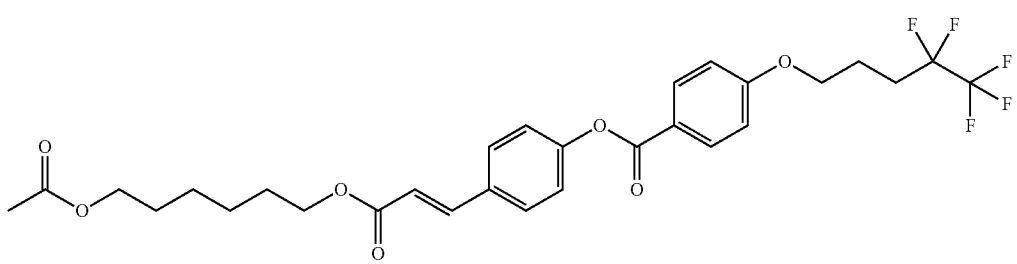

(Z-35)

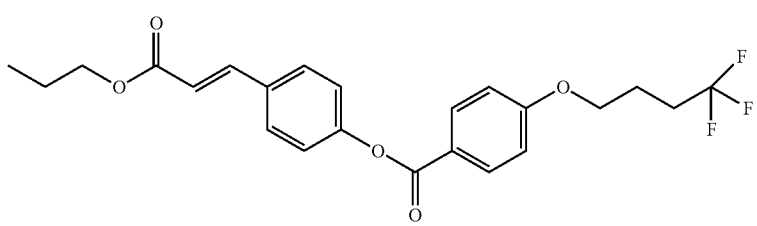

(Z-36)

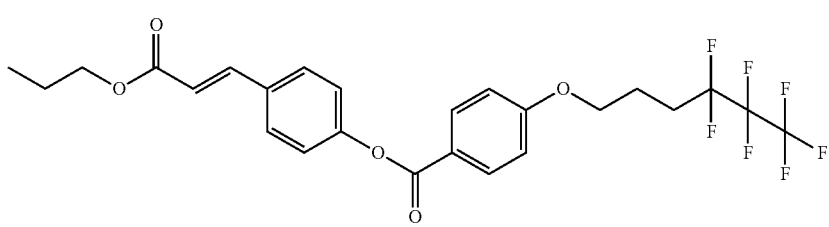

(Z-37)

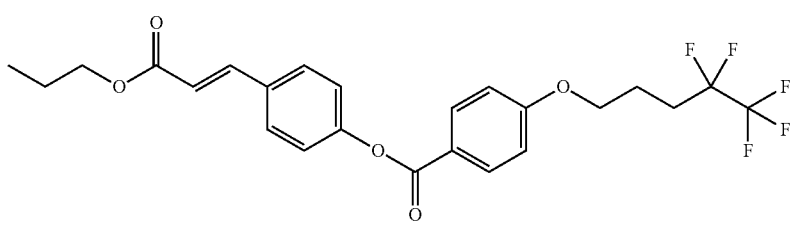

(Z-38)

When the rubbing treatment is applied to the alignment film 40 to form a horizontal alignment film, preferably, $Z^1$ in the above formulas (P1) and (P2) is the same or different and is the structure represented by the above formulas (Z-1) to (Z-8). When the rubbing treatment is applied to the alignment film 40 to form a vertical alignment film, preferably, $Z^1$ in the above formulas (P1) and (P2) is the same or different and is the structure represented by the above formulas (Z-9) to (Z-15). When the photo-alignment treatment is applied to the alignment film 40 to form a horizontal alignment film, preferably, $Z^1$ in the above formulas (P1) and (P2) is the same or different and is the structure represented by the above formulas (Z-16) to (Z-17). When the photo-alignment treatment is applied to the alignment film 40 to form a vertical alignment film, preferably, $Z^1$ in the above formulas (P1) and (P2) is the same or different and is the structure represented by the above formulas (Z-18) to (Z-38).

$R^1$s in the above formulas (P1) and (P2) are the same as or different from each other and each represent a divalent organic group. The divalent organic group is preferably a group represented by $*-R^{12}-(Z-A)_n-Sp-$. In the group represented by $*-R^{12}-(Z-A)_n-Sp-$, * represents a bonding position with $Y^1$, and Z, A, Sp and n have the same definitions as those of Z, A, Sp and n in the above formula (ZA) including the preferred range. $R^{12}$ represents a divalent linking group and is preferably a hydrocarbon group having 1 to 10 carbon atoms or a direct bond, more preferably an alkylene group having 1 to 10 carbon atoms or a direct bond. The alkylene group may be linear, branched, or cyclic.

More preferably, m in the above formulas (P1) and (P2) represents a copolymerization ratio, and m satisfies $0<m<1$, preferably satisfies $0.001 \leq m \leq 0.5$, and more preferably satisfies $0.01 \leq m \leq 0.2$. When the value of m is set within the above range, flicker and image sticking due to long-term use can be further suppressed, and alignment stability of the liquid crystal can be obtained.

In one molecule of the polymer having the structure represented by the above formulas (P1) and (P2), $X^1$, $Y^1$, $Z^1$ and $R^1$ may be used alone or in combination of two or more kinds thereof.

The polymer having a salicylic acid derivative functional group in the side chain preferably has a structure represented by the following formula (P1-A). Suitable adjustment of $m^1$ and $m^2$ in the following formula (P1-A) makes it possible to achieve both control of alignment of liquid crystal molecules and improvement of reliability by complex formation. A highly heat-resistant alignment film can be formed by using a polyamic acid main chain.

bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$—

[Formula 22]

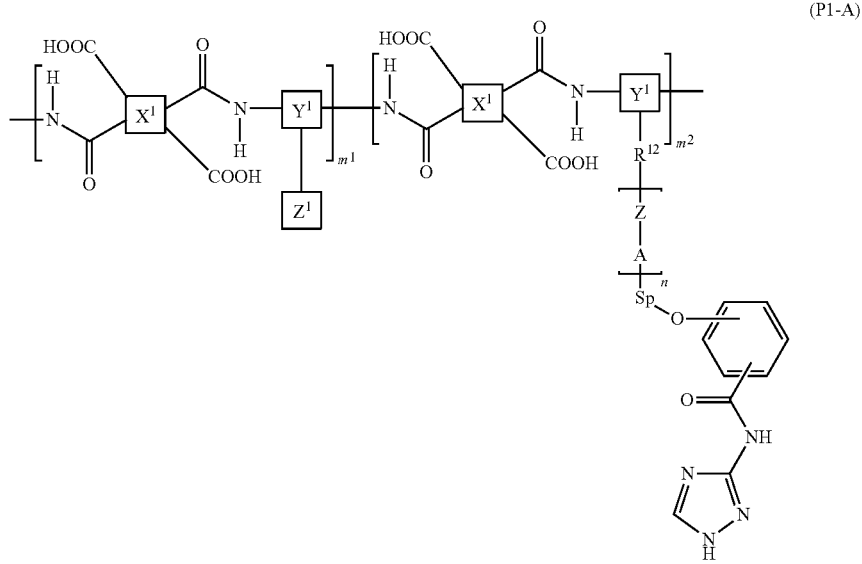

(P1-A)

In the formula (P1-A), $X^1$s are each a group represented by the following formula (PA-1), $Y^1$s are the same as or different from each other and each a group represented by the following formula (PA-2) or (PA-3), and $Z^1$s are the same as or different from each other and each a vertically alignable group, a horizontally alignable group, a photoreactive functional group, or a combination thereof;

Sps are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4- group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

ns are the same as or different from each other and each represent an integer of 0 or more;

$R^{12}$s are the same as or different from each other and each represent a hydrocarbon group having 1 to 10 carbon atoms or a direct bond; and $m^1$ and $m^2$ each independently represent a natural number.

[Formula 23]

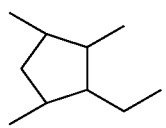

(PA-1)

-continued

[Formula 24]

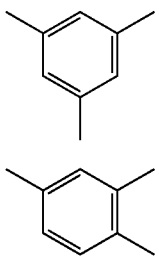

(PA-2)

(PA-3)

$Z^1$, $R^{12}$, Z, A, Sp and n in the above formula (P1-A) have the same definitions as those of $Z^1$, $R^{12}$, Z, A, Sp and n in the above formulas (P1) and (P2) including the preferred range.

The symbols $m^1$ and $m^2$ in the above formula (P1-A) each independently represent a natural number. The natural number herein represents an integer of 1 or more. The ratio of $m^1$ and $m^2$ in the above formula (P1-A) is preferably $m^1$:$m^2$=999:1 to 1:1, more preferably 99:1 to 4:1.

When the polymer having a salicylic acid derivative functional group in the side chain is polysiloxane, it is preferable that the polymer have a structure represented by the following formula (P3):

[Formula 25]

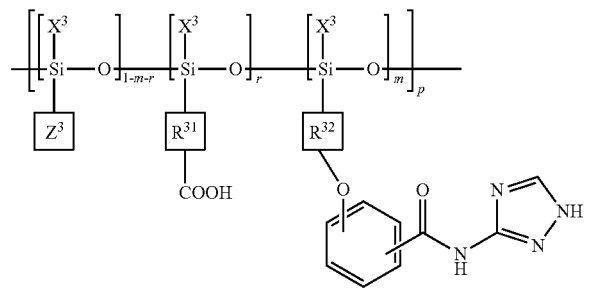

(P3)

wherein $X^3$s are the same as or different from each other and each represent a hydrogen atom, a hydroxyl group, or an alkoxy group having 1 to 5 carbon atoms, $R^{31}$s are the same as or different from each other and each represent a divalent organic group, $R^{32}$s are the same as or different from each other and each represent a divalent organic group, $Z^3$s are the same as or different from each other and each represent a monovalent organic group or a hydrogen atom, m and r satisfy 0<m<1, 0<r<1, and m+r<1, and p is an integer of 1 or more representing the degree of polymerization.

More preferably, $X^3$s in the above formula (P3) are the same as or different from each other, each represent a hydrogen atom, a hydroxyl group, or an alkoxy group having 1 to 5 carbon atoms, and are each a methoxy group or an ethoxy group.

$R^{31}$s in the above formula (P3) are the same as or different from each other and each represent a divalent organic group. The divalent organic group is preferably a group represented by *—COO—$R^3$—, more preferably *—COO—$C_6H_4$— group. In the group represented by *—COO—$R^3$—, * represents a bonding position with Si, $R^3$s are the same as or different from each other and each a hydrocarbon group having 1 to 20 carbon atoms, preferably a hydrocarbon group having 1 to 10 carbon atoms, more preferably a hydrocarbon group having 6 to 10 carbon atoms containing an aromatic ring.

$R^{32}$ and $Z^3$ in the above formula (P3) have the same definitions as those of $R^1$ and $Z^1$ in the above formulas (P1) and (P2) including the preferred range.

Preferably, m and r in the above formula (P3) represent copolymerization ratios, satisfy 0<m<1, 0<r<1, and m+r<1, and satisfy 0.01≤m≤0.2, 0<r≤0.5.

In one molecule of the polymer having the structure represented by the above formula (P3), $X^3$, $Z^3$, $R^{31}$ and $R^{32}$ may be used alone or in combination of two or more kinds thereof.

When the polymer having a salicylic acid derivative functional group in the side chain is polyacrylic acid, polymethacrylic acid, or polyvinyl, it is preferable that the polymer have a structure represented by the following formula (P4):

[Formula 26]

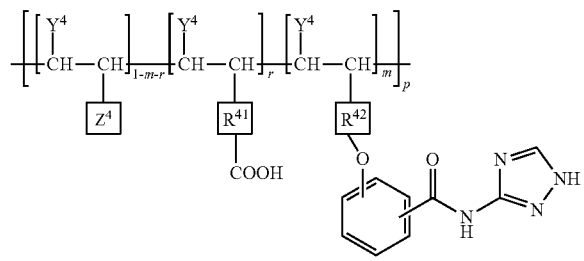

(P4)

wherein $Y^4$s are the same as or different from each other and each represent a hydrogen atom or an alkyl group having 1 to 5 carbon atoms, $R^{41}$s are the same as or different from each other and each represent a divalent organic group, $R^{42}$s are the same as or different from each other and each represent a divalent organic group, $Z^4$s are the same as or different from each other and each represent a monovalent organic group or a hydrogen atom, p is an integer of 1 or more, m and r satisfy 0<m<1, 0<r<1, and m+r<1.

$R^{41}$ in the above formula (P4) has the same definition as that of $R^{31}$ in the above formula (P3) including the preferred range. $R^{42}$ in the above formula (P4) has the same definition as that of $R^1$ in the above formulas (P1) and (P2) including the preferred range. $Z^4$ in the above formula (P4) has the same definition as that of $Z^1$ in the above formulas (P1) and (P2) including the preferred range.

More preferably, m and r in the above formula (P4) represent copolymerization ratios, satisfy 0<m<1, 0<r<1, and m+r<1, and satisfy 0.01≤m≤0.2, 0<r≤0.5.

In one molecule of the polymer having the structure represented by the above formula (P4), $Y^4$, $Z^4$, $R^{41}$ and $R^{42}$ may be used alone or in combination of two or more kinds thereof.

Although the alignment mode (display mode) of the reflective liquid crystal display device 100 of the present embodiment is not particularly limited, a vertical alignment (VA) mode is preferable.

The reflective liquid crystal display device 100 of the present embodiment has a configuration including components such as the above components; external circuits such as TCP (tape-carrier package) and PCB (printed circuit board); optical films such as a viewing angle-increasing film and a luminance-increasing film; and a bezel (frame). Some components, if appropriate, may be incorporated into another component. In addition to the components described above, the liquid crystal display device may include any components that are usually used in the field of liquid crystal display devices. The additional components are therefore not described here.

Embodiment 2

A liquid crystal display device of Embodiment 2 has the same configuration as the reflective liquid crystal display device of Embodiment 1 except that the structure of the liquid crystal display device is changed to a transflective type. Thus, in the present embodiment, features peculiar to this embodiment will be described, and description overlapping with Embodiment 1 will be omitted as appropriate.

Figure 2:
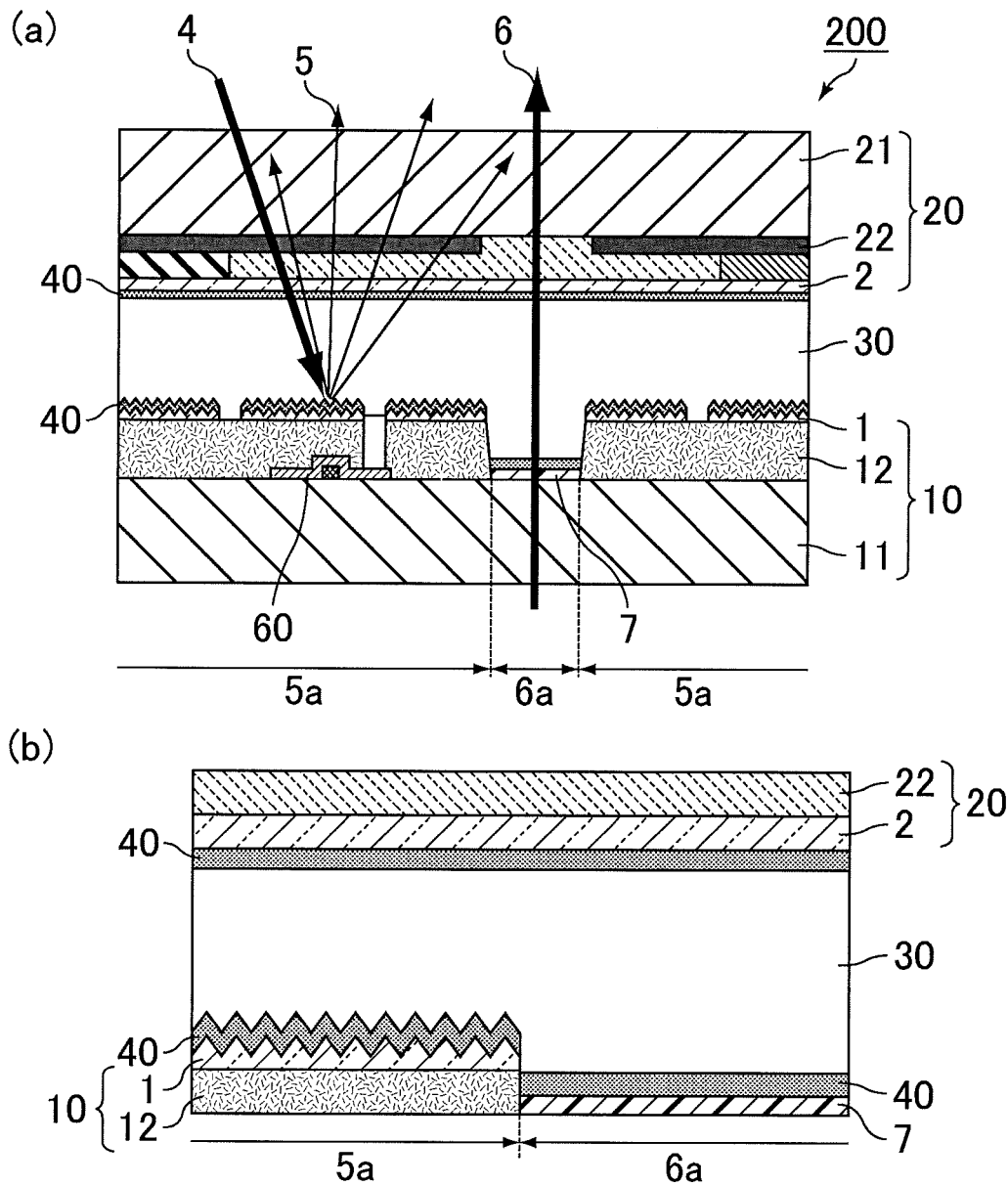
FIG. 2 is a view relating to a transflective liquid crystal display device of Embodiment 2, in which (a) is a schematic cross-sectional view of the transflective liquid crystal display device, and (b) is a schematic cross-sectional view enlarging (a).

FIG. 2 is a view relating to a transflective liquid crystal display device of Embodiment 2, in which (a) is a schematic cross-sectional view of the transflective liquid crystal display device, and (b) is a schematic cross-sectional view enlarging (a). A transflective liquid crystal display device 200 of Embodiment 2 has a light reflection portion 5a having the same configuration as the reflective liquid crystal device 100 of Embodiment 1 and a light transmission portion 6a which transmits light from backlight illumination and displays an image. In the light transmission portion 6a, the transparent electrode 7 and the alignment film 40 are sequentially arranged on the transparent substrate 11 toward the liquid crystal layer 30. Since the transparent electrode 7 is used in the light transmission portion 6a, an image can be displayed by backlight illumination 6.

As described above, since the transflective liquid crystal display device 200 is a liquid crystal display device having a function of displaying an image in both a transmissive mode and a reflective mode and has both the feature of a transmissive liquid crystal display device that since the device has backlight illumination, visibility is high even in a dark place and the feature of a reflective liquid crystal display device that power consumption is low because ambient light is used.

The present invention is described below in more detail based on examples and comparative examples. The examples, however, are not intended to limit the scope of the present invention.

[Synthesis of Diamine Monomer Having Salicylic Acid Derivative Functional Group]

A diamine monomer containing a salicylic acid derivative functional group in the side chain was synthesized by the reactions shown in the following formulas 3 to 6. Details will be described below.

[Formula 27]

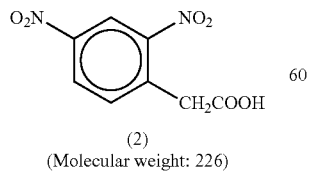

(2)
(Molecular weight: 226)

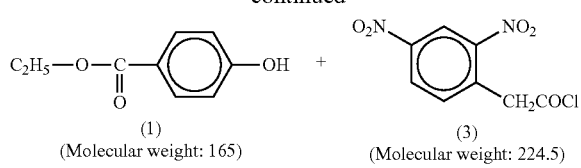

(1)
(Molecular weight: 165)

(3)
(Molecular weight: 224.5)

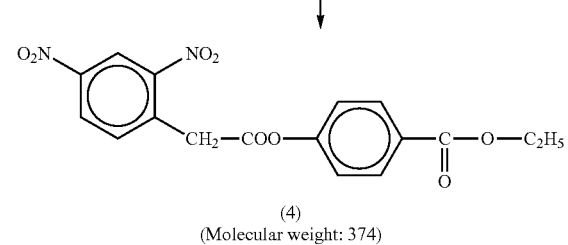

(4)
(Molecular weight: 374)

First, thionyl chloride was added dropwise to a THF solution (20 ml) containing 3 g (13.3 mmol) of dinitrophenylacetic acid shown in (2) of the above formula 3 to synthesize dinitrophenylacetyl chloride (11.6 mmol, yield: 87%) shown in (3). Subsequently, a THF solution (15 ml) containing 2.45 g (10 mmol) of dinitrophenylacetyl chloride shown in (3) was added dropwise at room temperature under a nitrogen atmosphere to a benzene (30 ml) solution containing 2.48 g (15 mmol) of ethyl 4-hydroxybenzoate and 1.5 g (15 mmol) of triethylamine shown in (1). Thereafter, the reaction was carried out at room temperature for 2 hours. After completion of the reaction, impurities were extracted with water and then purified by column chromatography (toluene/ethyl acetate (4/1)) to obtain 2.85 g (yield: 76%) of the compound shown in (4).

[Formula 28]

(Formula 4)

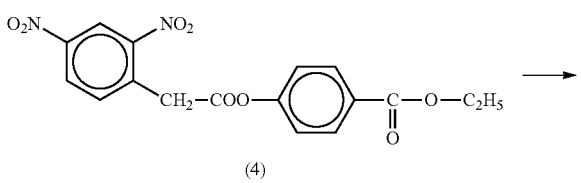

(4)

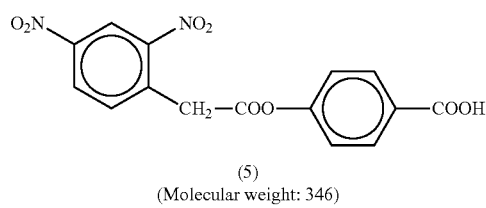

(5)
(Molecular weight: 346)

An aqueous sodium hydroxide solution was added dropwise to a THF/methanol mixed solution (30 ml) containing 1.87 g (5 mmol) of the obtained compound shown in (4), followed by dropwise addition of hydrochloric acid and stirring for 1 hour to synthesize 1.6 g (4.6 mmol) of the carboxylic acid compound shown in (5) of the above formula 4.

The compound shown in (6) of the following formula 5 was synthesized by repeating the processes of the above formulas 3 and 4.

[Formula 29]

(Formula 5)

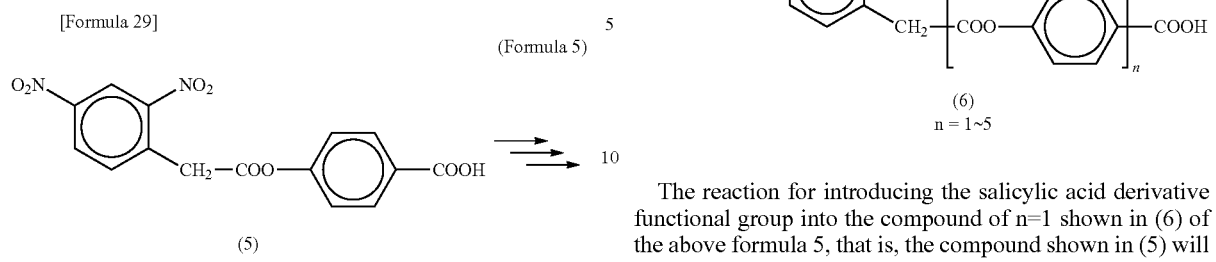

(5)

(6)
n = 1~5

The reaction for introducing the salicylic acid derivative functional group into the compound of n=1 shown in (6) of the above formula 5, that is, the compound shown in (5) will be described below using the following formula 6.

[Formula 30]

(Formula 6)

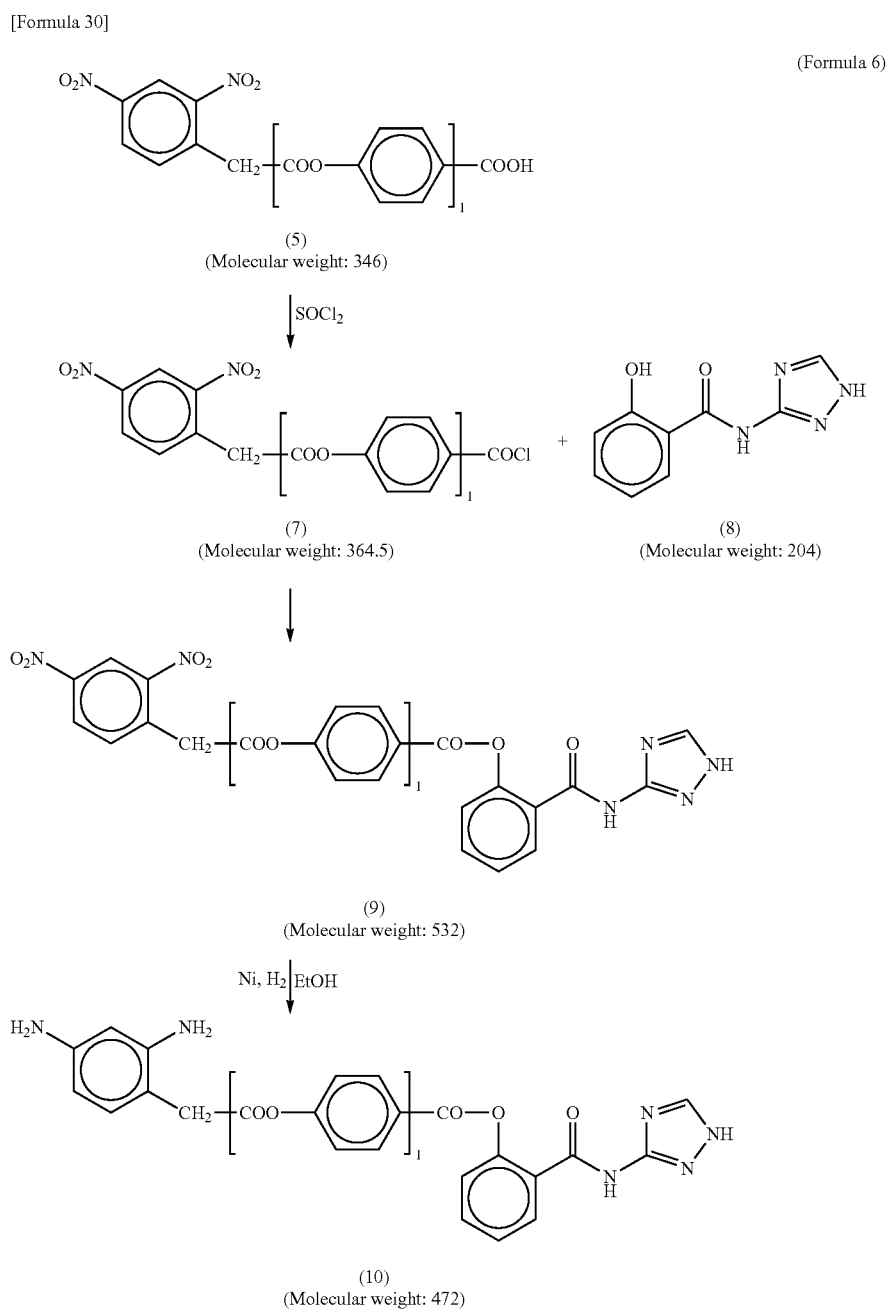

(5)
(Molecular weight: 346)

| SOCl$_2$ (7)
(Molecular weight: 364.5)

(8)
(Molecular weight: 204)

(9)
(Molecular weight: 532)

Ni, H$_2$ | EtOH

(10)
(Molecular weight: 472)

First, thionyl chloride was added dropwise to a THF solution (20 ml) containing 1.6 g (4.6 mmol) of the compound shown in (5) to synthesize the acid chloride compound (3.9 mmol, yield: 85%) shown in (7). Subsequently, a THF solution (15 ml) containing 1.42 g (3.9 mmol) of the acid chloride compound shown in (7) was added dropwise at room temperature under a nitrogen atmosphere to a benzene (20 ml) solution containing 1.43 g (7 mmol) of salicylic acid derivative and 1.0 g (10 mmol) of triethylamine shown in (8). Thereafter, the reaction was carried out at room temperature for 2 hours. After completion of the reaction, impurities were extracted with water and then purified by column chromatography (toluene/ethyl acetate (4/1)) to obtain 1.60 g (3.0 mmol, yield: 77%) of the compound shown in (9).

Then, 1.50 g (2.8 mmol) of the compound shown in (9) was dissolved in 20 ml of Solmix (registered trademark) AP-1, and 0.2 g of Raney nickel was added and charged in an autoclave. The atmosphere inside the system was replaced with hydrogen and left at room temperature overnight under a pressure of 0.4 MPa. Stopping of the reaction was confirmed by HPLC, and the reaction liquid was filtered through celite. The filtrate was concentrated until no more distillation occurred. The crude liquid obtained was distilled under reduced pressure to obtain 0.99 g (2.1 mmol, yield: 74%) of a diamine monomer having the salicylic acid derivative functional group shown in (10) of the above formula 6.

[Synthesis of Polymer Having Salicylic Acid Derivative Functional Group in Side Chain]

The synthesis of a polymer in which an introduction amount of diamine having a salicylic acid derivative functional group is 10 mol % (monomer in which m in the following formula (P1-1) is 0.10) will be described below.

An acid anhydride (0.10 mol) shown in the following formula (13) was added to a γ-butyrolactone solution containing a diamine monomer (0.01 mol) having a salicylic acid derivative functional group represented by the following formula (10) wherein n is 1, a vertically aligned group-containing diamine monomer (0.03 mol) shown in the following formula (11) and p-phenylenediamine (0.06 mol) shown in the following formula (12), and the mixture was reacted at 60° C. for 12 hours to obtain polyamic acid having a random structure.

[Formula 31]

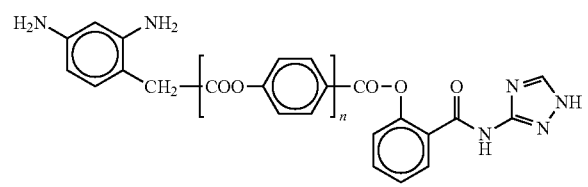

(10)

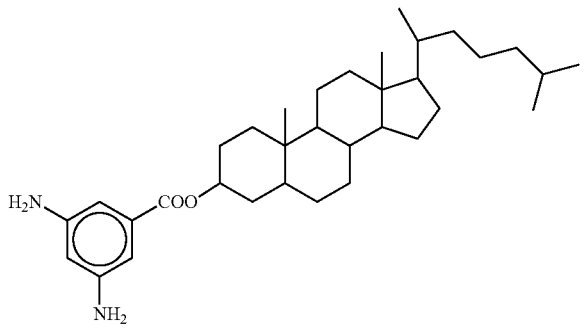

(11)

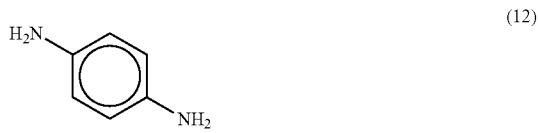

(12)

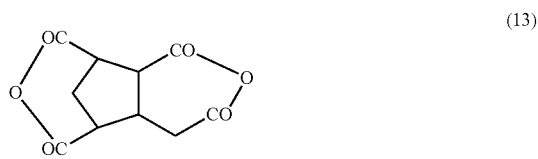

(13)

Excess pyridine (0.5 mol) and acetic anhydride (0.3 mol) were added to the γ-butyrolactone solution of the obtained polyamic acid, and the mixture was reacted at 150° C. for 3 hours to imidize the polyamic acid. The polyimide thus obtained had a weight average molecular weight of 30000 and a molecular weight distribution of 2.5. The imidization ratio was 80% or more. As described above, polyamic acid 1-2 in which m in the following formula (P1-1) was 0.10 was obtained. In addition, the introduction amount of the diamine monomer having a salicylic acid derivative functional group was prepared to obtain polyamic acids 1R, 1-1, 1-3 and 1-4 in which m in the following formula (P1-1) was 0, 0.05, 0.15 and 0.20.

Polyamic acids 1-1 to 1-4 were polyamic acids having a monomer unit containing a salicylic acid derivative functional group and a monomer unit not containing the salicylic acid derivative functional group, and the polyamic acid 1R was polyamic acid having only the monomer unit not containing the salicylic acid derivative functional group. The monomer unit is a structural unit derived from a monomer constituting a polymer.

[Formula 32]

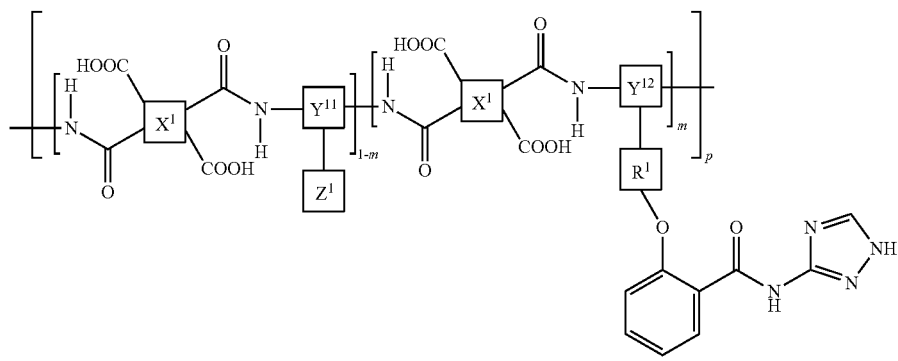

(P1-1)

[Formula 33]

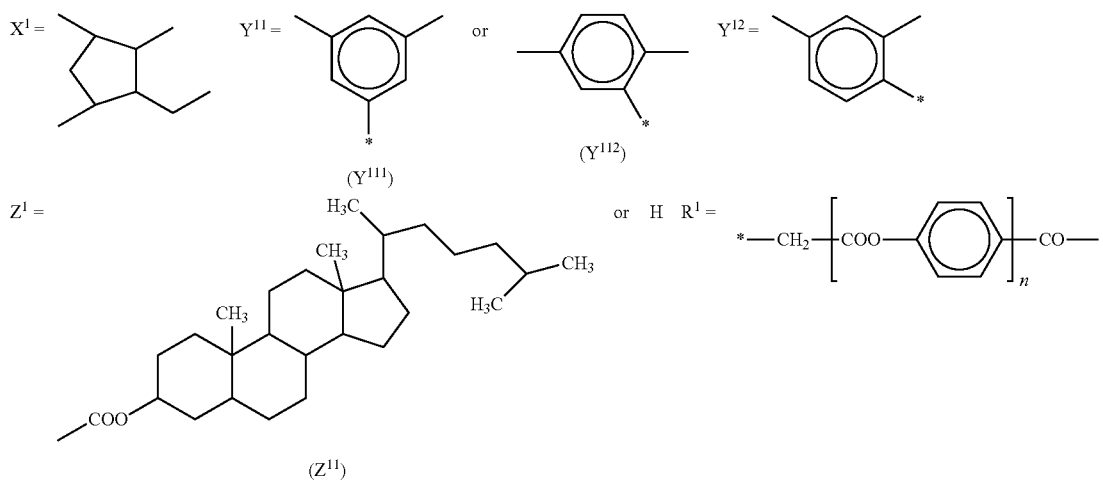

In the formula (P1-1), * shown in $Y^{111}$ and $Y^{112}$ represents a bonding position with $Z^1$, * shown in $Y^{12}$ represents a bonding position with $R^1$, and * shown in $R^1$ represents a bonding position with $Y^{12}$. When $Y^{11}$ is $Y^{111}$, $Z^1$ is $Z^{11}$, and when $Y^{11}$ is $Y^{112}$, $Z^1$ is a hydrogen atom. p represents an integer of 1 or more.

Among four bonds in $X^1$, two non-adjacent bonds are bonded to two amide groups in the above formula (P1-1). That is, at least one of a combination of upper left and lower right bonds in $X^1$ and a combination of lower left and upper right bonds is bonded to the amide group.

Examples 1-1 to 1-4 and Comparative Example 1

<Production of Reflective Liquid Crystal Display Device>

A first substrate 10 having a reflective electrode 1 formed of aluminum as a pixel electrode and a second substrate 20 having a transparent electrode 2 formed of ITO as a common electrode were prepared. The first substrate 10 and the second substrate 20 were each applied with a composition for vertical alignment film formation containing the polyamic acid 1-1, pre-fired at 80° C. for 2 minutes, then finally fired at 200° C. for 40 minutes, and subjected to rubbing treatment. The reflective electrode 1 used as a pixel electrode is also referred to as a reflective pixel electrode in the following description.

Then, a sealing agent was applied to the first substrate 10 having the reflective pixel electrode, a liquid crystal material ($\Delta\varepsilon \leq -5.0$) was added dropwise to the first substrate 10, and the second substrate 20 was bonded with the first substrate 10 to fabricate a liquid crystal cell.

The obtained liquid crystal cell was subjected to annealing treatment at a temperature equal to or higher than Tni (nematic-isotropic transition point of liquid crystal material) for 30 minutes, and realignment treatment was performed to produce a reflective liquid crystal display device of Example 1-1.

In addition, the polyamic acid 1-1 contained in the composition for vertical alignment film formation was changed to each of the polyamic acids 1-2, 1-3, 1-4 and 1R, and the same method as in Example 1-1 was used, thus producing reflective liquid crystal display devices of Examples 1-2, 1-3, and 1-4 and Comparative Example 1.

<Energization Test>

Energization of 5 V was performed with a rectangular wave of 60 Hz for 100 hours in an environment of 25° C., and VHR and residual DC voltage before and after energization were measured. The obtained results are shown in Table 1 below. The VHR was measured under conditions of 1 V and 70° C. using a 6254 type VHR measurement system manufactured by Toyo Corporation. The residual DC voltage was measured by a flicker elimination method after applying a DC offset voltage of 2 V for 2 hours. The residual DC voltage is also referred to as rDC.

TABLE 1

| Polyamic acid contained in alignment film | Initial (0 hour) VHR(%) | rDC(V) | After 100 hours VHR(%) | rDC(V) |
|---|---|---|---|---|
| Comparative Example 1 | 1R m = 0 | 99.5 | 0.03 | 95.9 | 0.23 |
| Example 1-1 | 1-1 m = 0.05 | 99.5 | 0.03 | 97.5 | 0.08 |
| Example 1-2 | 1-2 m = 0.10 | 99.5 | 0.02 | 98.0 | 0.07 |
| Example 1-3 | 1-3 m = 0.15 | 99.5 | 0.02 | 98.2 | 0.05 |
| Example 1-4 | 1-4 m = 0.20 | 99.5 | 0.02 | 98.3 | 0.05 |

As shown in Table 1, in Comparative Example 1 using polyamic acid having no salicylic acid derivative functional group in which m=0, initial VHR was 99.5%, the residual DC voltage was 0.03 V, the VHR after 100 hours of energization was 95.9%, and the residual DC voltage was 0.23 V. Thus, a significant reduction in VHR and increase in residual DC voltage were confirmed by the energization test. The reason why the reduction in VHR and the increase in residual DC voltage were confirmed in Comparative Example 1 is considered as follows.

An oxidation-reduction reaction occurs between aluminum ions eluted from the reflective pixel electrode containing aluminum to an alignment film and a carboxyl group in polyamic acid contained in the alignment film, and a radical is formed. It is considered that this radical transferred into the liquid crystal layer 30 having negative anisotropy of dielectric constant and was ionized by electron transfer to generate impurity ions in the liquid crystal layer 30, so that the reduction in VHR and the increase in residual DC voltage were confirmed in Comparative Example 1.

On the other hand, in Examples 1-1 to 1-4 using polyamic acid having a salicylic acid derivative functional group in the side chain, the reduction in VHR after 100 hours of energization was suppressed, and the increase in residual DC voltage was suppressed. In addition, as m as the introduction amount of the salicylic acid derivative functional group increased, the reduction in VHR after 100 hours of energization was suppressed to a lesser extent, and the increase in residual DC voltage was suppressed to a lesser extent. This is considered to be due to the fact that as the introduction amount of the salicylic acid derivative functional group in polyamic acid increased, more aluminum ions formed a complex with the salicylic acid derivative functional group, and the oxidation-reduction reaction caused by aluminum ions was suppressed.

As described above, in the reflective liquid crystal display devices of Examples 1-1 to 1-4, before and after the 100-hour energization test, the VHR was maintained high, and the residual DC voltage was suppressed low, so that it has been found that flicker and image sticking caused by long-term use can be suppressed.

Examples 2-1 to 2-5

<Synthesis of Polymer>

The symbol m of the polymer shown in the above formula (P1-1) was fixed to 0.2, n was changed to 1, 2, 3, 4 and 5, and polyamic acids 2-1, 2-2, 2-3, 2-4 and 2-5 were synthesized.

<Production of Reflective Liquid Crystal Display Device>

Reflective liquid crystal display devices of Examples 2-1 to 2-5 were produced in the same manner as in Example 1-1 except that the polyamic acid 1-1 in Example 1-1 was changed to the polyamic acids 2-1 to 2-5.

<Energization Test>

Regarding the reflective liquid crystal display devices of Examples 2-1 to 2-5, an energization test was conducted in the same manner as in Example 1-1 and the like. The obtained results are shown in Table 2 below.

TABLE 2

| Polyamic acid contained in alignment film | Initial (0 hour) VHR(%) | rDC(V) | After 100 hours VHR(%) | rDC(V) |
|---|---|---|---|---|
| Example 2-1 | 2-1 n = 1 | 99.5 | 0.02 | 98.3 | 0.05 |
| Example 2-2 | 2-2 n = 2 | 99.5 | 0.02 | 98.1 | 0.06 |
| Example 2-3 | 2-3 n = 3 | 99.5 | 0.03 | 98.5 | 0.05 |
| Example 2-4 | 2-4 n = 4 | 99.5 | 0.03 | 98.5 | 0.05 |
| Example 2-5 | 2-5 n = 5 | 99.5 | 0.02 | 98.4 | 0.04 |

As shown in Table 2, when n of $R^1$ in the above formula (P1-1) was changed from 1 to 5 and a distance between the salicylic acid derivative functional group and the main chain was changed, in both cases, the VHR after 100 hours of energization was maintained at 98% level, the residual DC voltage was suppressed to 0.06 V or less, and it has been found that flicker and image sticking caused by long-term use can be suppressed.

Examples 3-1 and 3-4 and Comparative Example 3

<Synthesis of Polymer>

The symbol n in the following formula (P1-2) was fixed to 1, polyamic acids 3R, 3-1, 3-2, 3-3 and 3-4 in which m was 0, 0.05, 0.10, 0.15, and 0.20 were synthesized.

Polyamic acids 3-1 to 3-4 were polyamic acids having a monomer unit containing a salicylic acid derivative functional group and a monomer unit not containing the salicylic acid derivative functional group, and the polyamic acid 3R was polyamic acid having only the monomer unit not containing the salicylic acid derivative functional group.

[Formula 34]

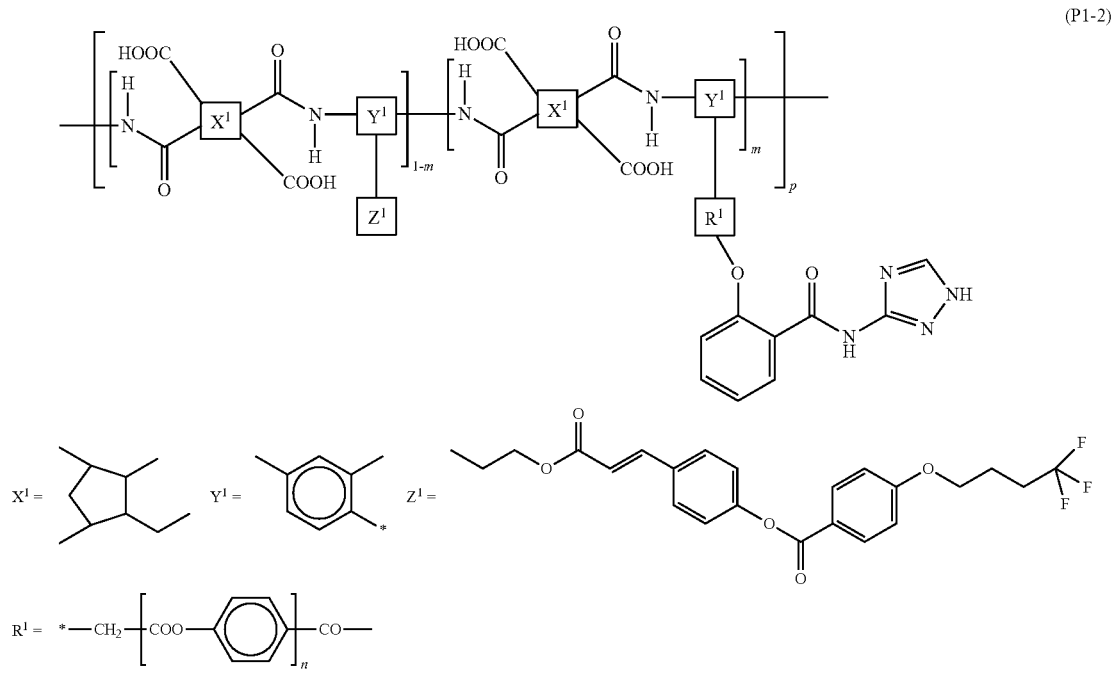

In the formula (P1-2), * shown in $Y^1$ represents a bonding position with $Z^1$ and $R^1$, and * shown in $R^1$ represents a bonding position with $Y^1$. p represents an integer of 1 or more.

Among four bonds in $X^1$, two non-adjacent bonds are bonded to two amide groups in the above formula (P1-2). That is, at least one of a combination of upper left and lower right bonds in $X^1$ and a combination of lower left and upper right bonds is bonded to the amide group.

<Production of Transflective Liquid Crystal Display Device>

While a reflective electrode 1 including two layers of an aluminum layer and an IZO layer was provided as a pixel electrode on a portion of a transparent substrate, a transparent electrode formed of ITO was provided as a pixel electrode on the remaining portion of the transparent substrate, and the first substrate 10 was prepared. In addition, a transparent electrode formed of ITO was provided as a common electrode on the transparent substrate, and the second substrate 20 was prepared.

Subsequently, the first substrate 10 and the second substrate 20 were each applied with a composition for vertical alignment film formation containing the polyamic acid 3-1, pre-fired at 80° C. for 2 minutes, then finally fired at 200° C. for 40 minutes, and subjected to photo-alignment treatment by being irradiated with polarized ultraviolet light.

Then, a sealing agent was applied to the first substrate 10, a liquid crystal material ($\Delta\varepsilon \leq -6.0$) was added dropwise to the first substrate 10, and the second substrate 20 was bonded with the first substrate 10 to fabricate a liquid crystal cell.

The obtained liquid crystal cell was subjected to annealing treatment at a temperature equal to or higher than Tni (nematic-isotropic transition point of liquid crystal material) for 30 minutes, and realignment treatment was performed to produce a transflective liquid crystal display device of Example 3-1.

In addition, the polyamic acid 3-1 contained in the composition for vertical alignment film formation was changed to the polyamic acids 3-2, 3-3, 3-4 and 3R, and the same method as in Example 3-1 was used, thus producing transflective liquid crystal display devices of Examples 3-2, 3-3, and 3-4 and Comparative Example 3.

<Energization Test>

Regarding the transflective liquid crystal display devices of Examples 3-1 to 3-4 and Comparative Example 3, an energization test was conducted in the same manner as in Example 1-1 and the like. The obtained results are shown in Table 3 below.

TABLE 3

| | Polyamic acic contained in alignment film | | Initial (0 hour) | | After 100 hours | |
|---|---|---|---|---|---|---|
| | | | VHR (%) | rDC (V) | VHR (%) | rDC (V) |
| Comparative Example 3 | 3R | m = 0 | 98.9 | 0.14 | 93.2 | 0.46 |
| Example 3-1 | 3-1 | m = 0.05 | 99.0 | 0.08 | 96.3 | 0.19 |
| Example 3-2 | 3-2 | m = 0.10 | 99.0 | 0.06 | 97.5 | 0.12 |
| Example 3-3 | 3-3 | m = 0.15 | 99.0 | 0.05 | 97.7 | 0.10 |
| Example 3-4 | 3-4 | m = 0.20 | 99.0 | 0.05 | 97.7 | 0.10 |

As shown in Table 3, in Comparative Example 3 using polyamic acid having no salicylic acid derivative functional group in which m=0, initial VHR was 98.9%, the residual DC voltage was 0.14 V, the VHR after 100 hours of energization was 93.2%, and the residual DC voltage was 0.46 V. Thus, a significant reduction in VHR and increase in residual DC voltage were confirmed by the energization test. It is considered that this is because, similarly to Comparative Example 1, the oxidation-reduction reaction occurred between aluminum ions eluted from the reflective pixel electrode containing aluminum into an alignment film and a carboxyl group in polyamic acid contained in the alignment film, a radical was formed, and impurity ions were generated in the liquid crystal layer 30.

On the other hand, in Examples 3-1 to 3-4 using polyamic acid having a salicylic acid derivative functional group in the side chain, the reduction in VHR after 100 hours of energization was suppressed, and the increase in residual DC voltage was suppressed. In addition, as m as the introduction amount of the salicylic acid derivative functional group increased, the reduction in VHR after 100 hours of energization was suppressed to a lesser extent, and the increase in residual DC voltage was suppressed to a lesser extent. As in Examples 1-1 to 1-4, this is considered to be due to the fact that as the introduction amount of the salicylic acid derivative functional group in polyamic acid increased, more aluminum ions formed a complex with the salicylic acid derivative functional group, and the oxidation-reduction reaction caused by aluminum ions was suppressed.

Examples 4-1 to 4-5

<Synthesis of Polymer>

In the following formula (P3-1), m was fixed to 0.1, r was fixed to 0.2, n was changed to 1, 2, 3, 4 and 5, and polysiloxanes 4-1, 4-2, 4-3, 4-4 and 4-5 were synthesized. Polysiloxanes 4-1, 4-2, 4-3, 4-4 and 4-5 were polysiloxanes containing photoalignable functional groups.

[Formula 35]

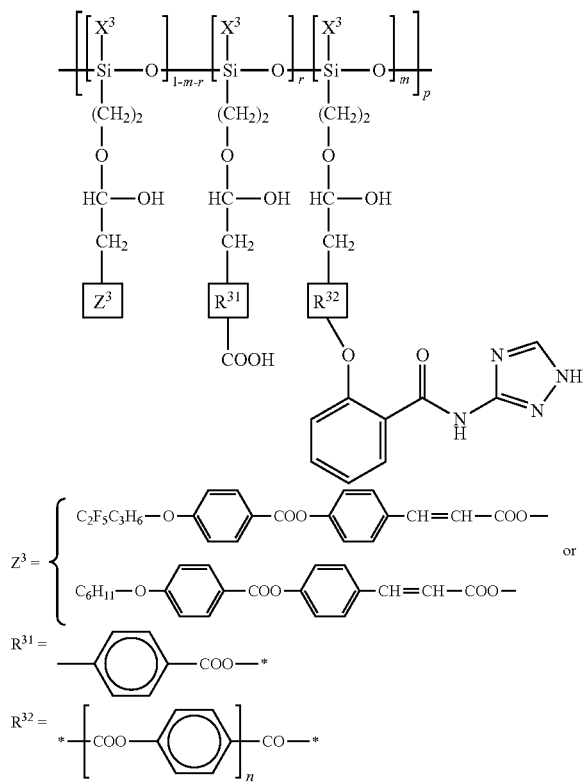

In the formula (P3-1), * shown in each of $R^{31}$ and $R^{32}$ represents a bonding position with Si. p represents an integer of 1 or more.

<Production of Transflective Liquid Crystal Display Device>

Transflective liquid crystal display devices of Examples 4-1 to 4-5 were produced in the same manner as in Example 3-1 except that the polyamic acid 3-1 in Example 3-1 was changed to the polysiloxanes 4-1 to 4-5, the temperature of final firing was changed to 230° C., and the anisotropy of dielectric constant Δε of the liquid crystal material was changed to −6.5.

<Energization Test>

Regarding the transflective liquid crystal display devices of Examples 4-1 to 4-5, an energization test was conducted in the same manner as in Example 1-1 and the like. The obtained results are shown in Table 4 below.

TABLE 4

| | Polysiloxane contained in alignment film | | Initial (0 hour) | | After 100 hours | |
|---|---|---|---|---|---|---|
| | | | VHR(%) | rDC(V) | VHR(%) | rDC(V) |
| Example 4-1 | 4-1 | n = 1 | 99.2 | 0.03 | 98.4 | 0.07 |
| Example 4-2 | 4-2 | n = 2 | 99.3 | 0.03 | 98.5 | 0.07 |
| Example 4-3 | 4-3 | n = 3 | 99.1 | 0.04 | 98.5 | 0.06 |
| Example 4-4 | 4-4 | n = 4 | 99.1 | 0.03 | 98.5 | 0.08 |
| Example 4-5 | 4-5 | n = 5 | 99.3 | 0.02 | 98.4 | 0.06 |

As shown in Table 4, even when polysiloxane having a salicylic acid derivative functional group in the side chain was used, the reduction in VHR after 100 hours of energization was suppressed, and the increase in residual DC voltage was also suppressed. In addition, even when n in the above formula (P3-1) was changed from 1 to 5 and the distance between the salicylic acid derivative functional group and the main chain was changed, the VHR after 100 hours of energization was maintained at 98% level, and the residual DC voltage was suppressed to 0.08 V or less.

ADDITIONAL REMARKS

One aspect of the present invention may be a liquid crystal display device (the reflective liquid crystal display device 100 or the transflective liquid crystal display device 200) which sequentially has the first substrate 10, the liquid crystal layer 30, and the second substrate 20 and has the alignment film 40 including a polymer having a salicylic acid derivative functional group in the side chain on the liquid crystal layer 30 side of at least one of the first substrate 10 and the second substrate 20. In this liquid crystal display device, the salicylic acid derivative functional group has a structure represented by the following formula (Z).

[Formula 36]

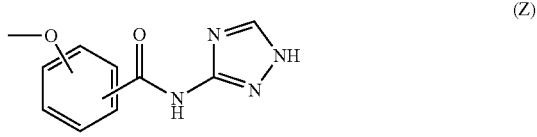

According to such an aspect, even when metal ions are generated from the electrode, a complex is formed between the metal ion and the salicylic acid derivative functional group, and it is possible to suppress oxidation-reduction reaction caused by metal ions. As a result, even with long-term use, it is possible to suppress the reduction in VHR and the increase in residual DC voltage in the liquid crystal display device, and flicker and image sticking can be suppressed.

The structure represented by the above formula (Z) may be a part of a structure represented by the following formula (ZA):

[Formula 37]

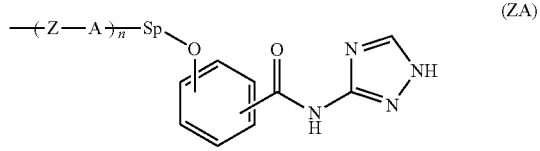

(ZA)

wherein Sp represents an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; and n represents an integer of 0 or more.

The polymer may have a carboxyl group. Since the carboxyl group of the polymer causes oxidation-reduction reaction to generate a radical and is ionized after transferred to the liquid crystal layer, this causes the reduction in VHR and the increase in residual DC voltage in the liquid crystal display device in the long-term use, so that flicker and image sticking may occur. However, according to one aspect of the present invention, it is possible to suppress generation of ions derived from the radical, and even with long-term use, the reduction in VHR and the increase in residual DC voltage can be suppressed, and flicker and image sticking can be suppressed.

The polymer may be a polyamic acid, a polyimide, a polysiloxane, polyacryl, polymethacryl, or polyvinyl.

The polymer may include a photoreactive functional group. Such an aspect can avoid occurrence of streaky display unevenness and static electricity generated when an alignment film for rubbing treatment is used.

The photoreactive functional group may be a cinnamate group, a chalcone group, a coumarin group, an azobenzene group, or a tolan group.

The polymer may be polyamic acid having a structure represented by the following formula (P1-A):

[Formula 38]

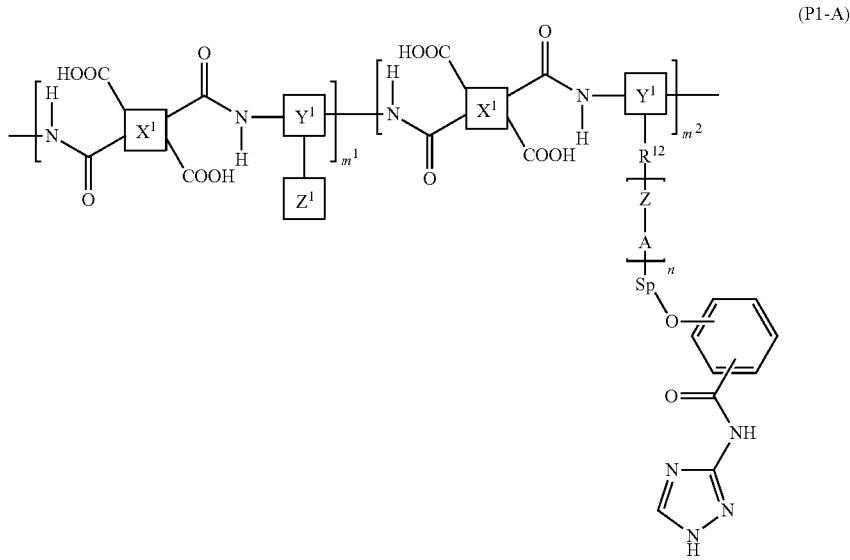

(P1-A)

wherein $X^1$s are each a group represented by the following formula (PA-1), $Y^1$ is the same or different and is a group represented by the following formula (PA-2) or (PA-3), and $Z^1$ is the same or different and is a vertically alignable group, a horizontally alignable group, a photoreactive functional group, or a combination thereof;

Sps are the same as or different from each other and each represent an —O— group, a —S— group, an —NH— group, a —CO— group, a —COO— group, an —OCO— group, an —O—COO— group, an —OCH₂— group, a —CH₂O— group, a —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, a —SCF₂— group, an —N(CF₃)— group, a —CH₂CH₂— group, a —CF₂CH₂— group, a —CH₂CF₂— group, a —CF₂CF₂— group, a —CH═CH— group, a —CF═CF— group, a —C≡C— group, a —CH═CH—COO— group, an —OCO—CH═CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH₂— group, a —CH₂O— group, a —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, a —SCF₂— group, an —N(CF₃)— group, a —CH₂CH₂— group, a —CF₂CH₂— group, a —CH₂CF₂— group, a —CF₂CF₂— group, a —CH═CH— group, a —CF═CF— group, a —C≡C— group, a —CH═CH—COO— group, an —OCO—CH═CH— group, or a direct bond;

ns are the same as or different from each other and each represent an integer of 0 or more;

$R^{12}$s are the same as or different from each other and each represent a hydrocarbon group having 1 to 10 carbon atoms or a direct bond; and $m^1$ and $m^2$ each independently represent a natural number.

[Formula 39]

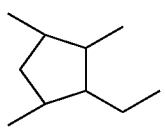
(PA-1)

[Formula 40]

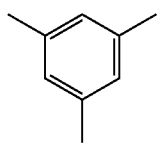
(PA-2)

-continued

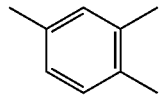
(PA-3)

The liquid crystal layer 30 may be formed of a liquid crystal material having negative anisotropy of dielectric constant. The liquid crystal material having negative anisotropy of dielectric constants tends to easily take in polar moisture as compared with a liquid crystal material having positive anisotropy of dielectric constant and to easily cause ionization of a metal plate electrode material and the like. However, according to one aspect of the present invention, even with long-term use, it is possible to suppress the reduction in VHR and the increase in residual DC voltage, and flicker and image sticking can be suppressed.

The liquid crystal material may have an anisotropy of dielectric constant of −5.0 or less. Such an aspect can achieve further low-voltage driving.

At least one of the first substrate 10 and the second substrate 20 has an electrode (reflective electrode 1), and the electrode may include at least one selected from the group consisting of Al, Ag, Zn, Cu and alloys thereof. When a conductive material with high degree of ionization such as Al, Ag, Zn, or Cu is used as an electrode, the long-term use leads to the reduction in VHR and the increase in residual DC voltage, causing flicker and image sticking, which may lower reliability. However, according to one aspect of the present invention, it is possible to suppress flicker and image sticking caused by long-term use.

The liquid crystal display device may be the reflective liquid crystal display device 100.

The liquid crystal display device may be the transflective liquid crystal display device 200.

REFERENCE SIGNS LIST

1: reflective electrode
2, 7: transparent electrode
4: ambient light
5: reflected light
5a: light reflection portion
6: backlight illumination
6a: light transmission portion
10: first substrate
11, 21: transparent substrate
12: insulating film
20: second substrate
22: color filter
30: liquid crystal layer
40: alignment film
60: thin-film transistor (TFT)
100: reflective liquid crystal display device
200: transflective liquid crystal display device

The invention claimed is:

1. A liquid crystal display device comprising, in the following order:
   a first substrate;
   a liquid crystal layer; and
   a second substrate,
   the liquid crystal display device comprising an alignment film including a polymer comprising a salicylic acid derivative functional group in a side chain on the liquid crystal layer side of at least one of the first substrate and the second substrate, the salicylic acid derivative functional group having a structure represented by the following formula (Z):

[Formula 1]

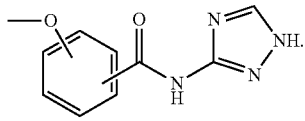

(Z)

2. The liquid crystal display device according to claim 1, wherein the structure represented by the formula (Z) is a part of a structure represented by the following formula (ZA):

[Formula 2]

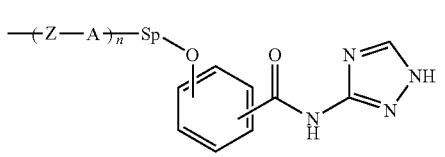

(ZA)

wherein Sp represents an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH$_2$— group, a —CH$_2$O— group, a —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, a —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; and n represents an integer of 0 or more.

3. The liquid crystal display device according to claim 1, wherein the polymer has a carboxyl group.

4. The liquid crystal display device according to claim 1, wherein the polymer is a polyamic acid, a polyimide, a polysiloxane, polyacryl, polymethacryl, or polyvinyl.

5. The liquid crystal display device according to claim 1, wherein the polymer includes a photoreactive functional group.

6. The liquid crystal display device according to claim 5, wherein the photoreactive functional group is a cinnamate group, a chalcone group, a coumarin group, an azobenzene group, or a tolan group.

7. The liquid crystal display device according to claim 1, wherein the polymer is a polyamic acid with a structure represented by the following formula (P1-A):

[Formula 3]

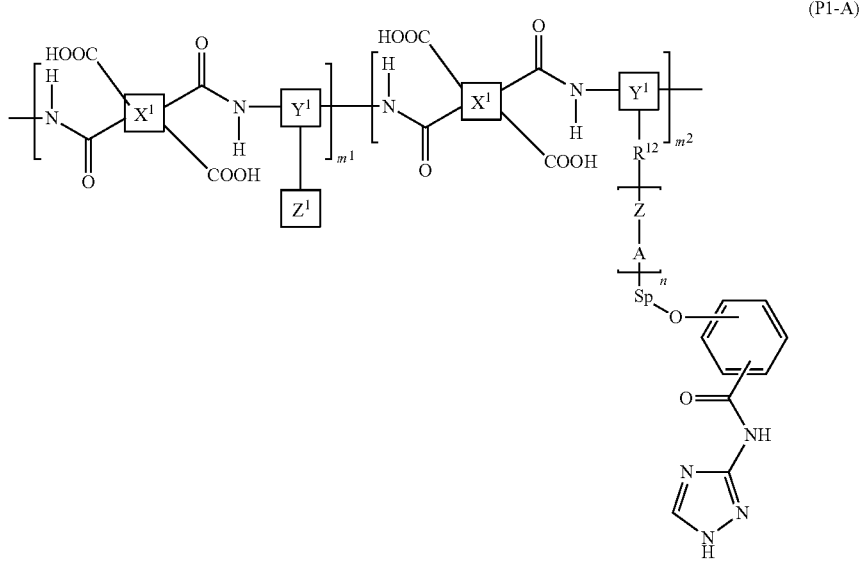

(P1-A)

wherein X¹s are each a group represented by the following formula (PA-1), Y¹s are the same as or different from each other and each a group represented by the following formula (PA-2) or (PA-3), and Z¹s are the same as or different from each other and each a vertically alignable group, a horizontally alignable group, a photoreactive functional group, or a combination thereof;

Sps are the same as or different from each other and each represent an —O— group, a —S— group, an —NH— group, a —CO— group, a —COO— group, an —OCO— group, an —O—COO— group, an —OCH₂— group, a —CH₂O— group, a —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, a —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a C≡C— group, a —CH=CH—COO— group, an —OCO—CH=CH— group, or a direct bond;

As are the same as or different from each other and each represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2,2,2]octylene group, a piperidine-1,4-diyl group, a decahydronaphthalene-2,6-diyl group, a 1,2,3,4-tetrahydronaphthalene-2,6-diyl group, an indan-1,3-diyl group, an indan-1,5-diyl group, an indan-2,5-diyl group, a phenanthrene-1,6-diyl group, a phenanthrene-1,8-diyl group, a phenanthrene-2,7-diyl group, or a phenanthrene-3,6-diyl group;

Zs are the same as or different from each other and each represent an —O— group, a —S— group, an —NH— group, a —CO— group, a —COO— group, an —OCO— group, an —O—COO— group, an —OCH₂— group, a —CH₂O— group, a —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, a —SCF₂— group, an —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, an —OCO—CH=CH— group, or a direct bond;

ns are the same as or different from each other and each represent an integer of 0 or more;

R¹²s are the same as or different from each other and each represent a hydrocarbon group having 1 to 10 carbon atoms or a direct bond; and m¹ and m² each independently represent a natural number,

[Formula 4]

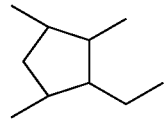

(PA-1)

[Formula 5]

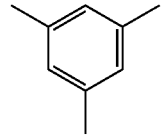

(PA-2)

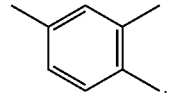

(PA-3)

8. The liquid crystal display device according to claim 1, wherein the liquid crystal layer comprises a liquid crystal material having negative anisotropy of dielectric constant.

9. The liquid crystal display device according to claim 8, wherein the liquid crystal material has an anisotropy of dielectric constant of −5.0 or less.

10. The liquid crystal display device according claim 1, wherein at least one of the first substrate and the second substrate has an electrode, and the electrode comprises at least one selected from the group consisting of Al, Ag, Zn, Cu and alloys thereof.

11. The liquid crystal display device according to claim 1, which is a reflective liquid crystal display device.

12. The liquid crystal display device according to claim 1, which is a transflective liquid crystal display device.

* * * * *